United States Patent
Sano et al.

(10) Patent No.: US 9,423,833 B2
(45) Date of Patent: Aug. 23, 2016

(54) HINGE STRUCTURE WITH STAND AND KEYBOARD DEVICE

(71) Applicant: Sony Corporation, Tokyo (JP)

(72) Inventors: Tatsuya Sano, Tokyo (JP); Naka Shibata, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 174 days.

(21) Appl. No.: 14/475,642

(22) Filed: Sep. 3, 2014

(65) Prior Publication Data

US 2016/0062413 A1 Mar. 3, 2016

(51) Int. Cl.
| | |
|---|---|
| *G06F 1/16* | (2006.01) |
| *E05D 11/10* | (2006.01) |
| *E05D 7/12* | (2006.01) |
| *E05D 3/02* | (2006.01) |
| *G06F 3/0482* | (2013.01) |
| *G06F 3/0488* | (2013.01) |

(52) U.S. Cl.
CPC ............ *G06F 1/1654* (2013.01); *E05D 3/02* (2013.01); *E05D 7/12* (2013.01); *E05D 11/10* (2013.01); *G06F 1/166* (2013.01); *G06F 1/1632* (2013.01); *G06F 1/1669* (2013.01); *G06F 1/1681* (2013.01); *G06F 3/0482* (2013.01); *G06F 3/04886* (2013.01); *E05D 2007/128* (2013.01); *E05D 2011/1092* (2013.01)

(58) Field of Classification Search
CPC ...... G06F 1/1632; G06F 1/1654; G06F 1/166
USPC ............. 361/679.41–679.45, 679.29, 679.59; 248/145.6, 155.1
See application file for complete search history.

(56) References Cited

U.S. PATENT DOCUMENTS

| | | | | |
|---|---|---|---|---|
| 5,100,098 A | * | 3/1992 | Hawkins | ............... F16M 11/041 16/339 |
| 6,053,589 A | * | 4/2000 | Lin | ......................... G06F 1/166 312/271 |
| 7,675,743 B2 | * | 3/2010 | Tae | ........................ G06F 1/1626 248/274.1 |

(Continued)

FOREIGN PATENT DOCUMENTS

JP 2005-12458 A 1/2005

OTHER PUBLICATIONS

Extended European Search Report issued Nov. 17, 2015 in Patent Application No. 14190502.6.

*Primary Examiner* — Nidhi Thaker
(74) *Attorney, Agent, or Firm* — Oblon, McClelland, Maier & Neustadt, L.L.P

(57) ABSTRACT

Embodiments include a hinge structure attached to a keyboard device and a tablet terminal. The hinge structure includes a cam mechanism and a stand member configured to rotate to a support position based on the position of a tablet terminal attached to the hinge structure. When the tablet terminal is rotated by a user to a first predetermined angle relative to the keyboard device, the stand member will in turn automatically rotate and extend. When the tablet terminal is rotated by a user to a second predetermined angle relative to the keyboard device, the stand member will in turn lock in order to support and brace the combination of the attached tablet terminal and keyboard device. When not using the attached tablet terminal, the locked stand member may be unlocked and released upon closing the attached table terminal to a zero degree angle relative to the keyboard device.

18 Claims, 21 Drawing Sheets

(56) References Cited

U.S. PATENT DOCUMENTS

| | | | | |
|---|---|---|---|---|
| 8,000,092 B2* | 8/2011 | Kim | ..................... | F16M 11/00 248/917 |
| 2004/0207598 A1* | 10/2004 | Hsu | ..................... | G06F 1/1632 345/156 |
| 2010/0053876 A1* | 3/2010 | Widmer | ............... | G06F 1/1616 361/679.27 |
| 2012/0178507 A1 | 7/2012 | Lee | | |
| 2013/0163187 A1* | 6/2013 | Wang | .................... | G06F 1/1632 361/679.41 |
| 2013/0322011 A1 | 12/2013 | Yeh | | |
| 2015/0185783 A1* | 7/2015 | Hui | ..................... | G06F 1/1656 361/679.29 |
| 2016/0054761 A1* | 2/2016 | Wolff | ...................... | E05D 7/10 361/679.09 |

* cited by examiner

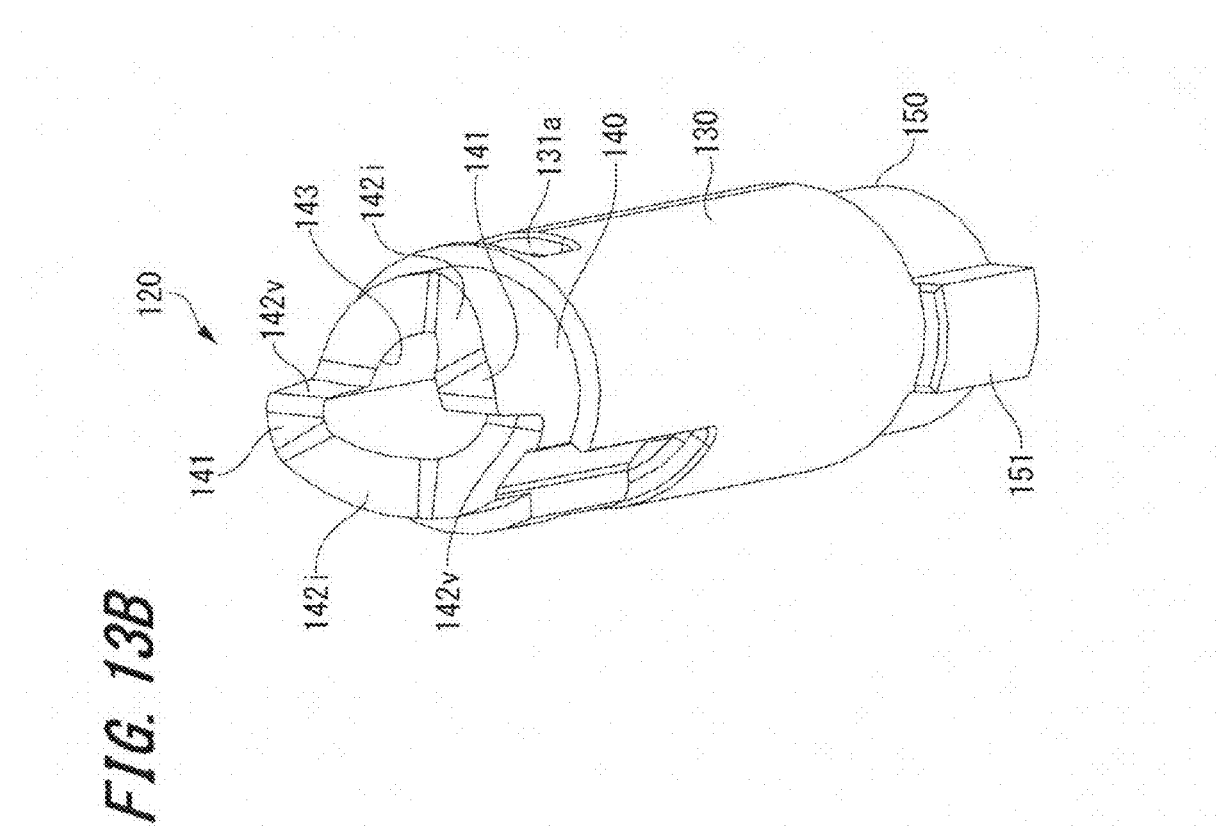
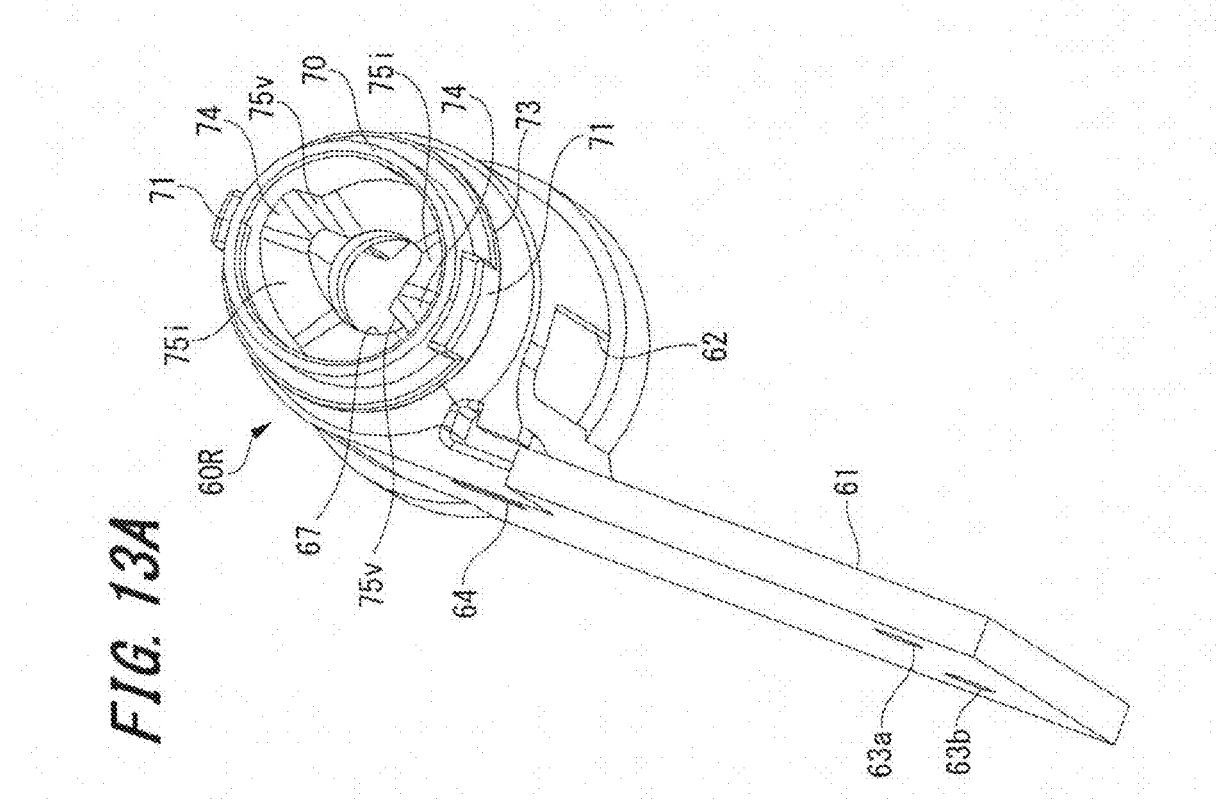

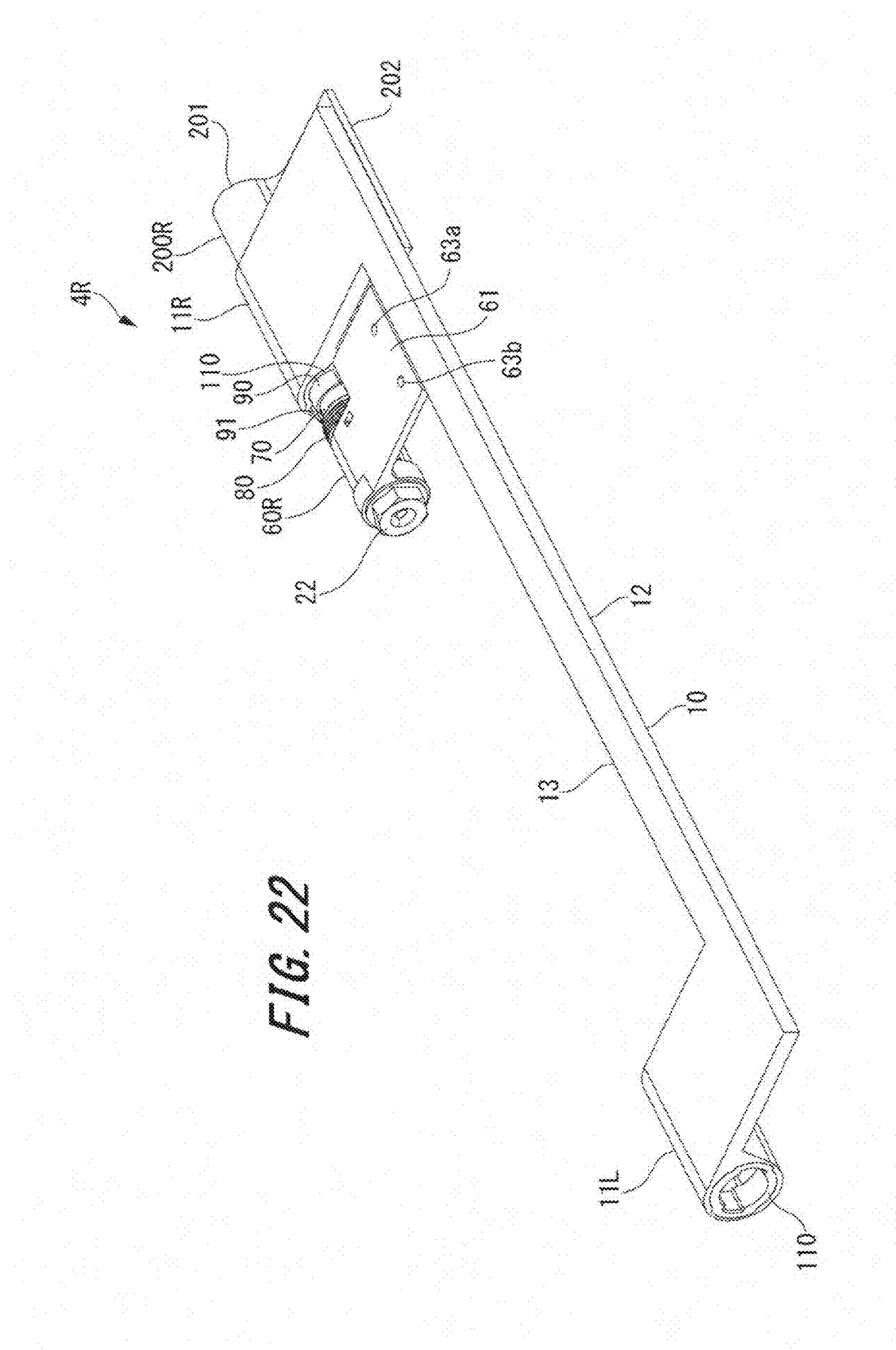

HINGE STRUCTURE WITH STAND AND KEYBOARD DEVICE

BACKGROUND

1. Field of the Disclosure

This disclosure relates to a hinge structure with a stand, and a keyboard device. More specifically, this disclosure relates to a keyboard device provided with a hinge structure including a stand which can be rotated.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

In recent years, products which can attach to or detach from portable apparatuses, such as a tablet terminal or mobile device, to a keyboard device have been sold. A user can use a portable apparatus on a standalone basis or link a portable apparatus and a keyboard device. However, when a keyboard device is mounted with a portable apparatus, depending on the angle of the portable apparatus and the keyboard device, the portable apparatus and keyboard device may fall down or backwards due to the weight of the portable apparatus. In other words, the opening angle of the portable apparatus is limited by making small the opening angle of the portable apparatus with respect to the keyboard device, thus limiting the full functionality of present products which can attach to or detach from portable apparatuses, such as a tablet terminal or mobile device, with regard to viewing angles between the portable apparatus and its attached keyboard device during use.

Thus, as recognized by the present inventor, there is a need for a stand or stabilizer which prevents portable apparatuses in combination with a detachable keyboard device from being vulnerable to falling down or backwards regardless of the viewing angles between the portable apparatus and the attached keyboard device.

Therefore, as discussed below, in order to prevent a portable apparatus and a keyboard device from becoming unstable and falling down or backwards, a keyboard device is provided with a hinge structure including a stand and specifically a hinge structure including a stand is proposed.

SUMMARY

Embodiments include a hinged support and stand apparatus having a stand and a rotating member attached to the stand and a holding part configured to removably attach a mobile device thereto. The rotating member is configured to coaxially rotate the stand and the rotating member. The rotating member includes a first rotating mechanism configured to rotate the rotating member and a second rotating mechanism configured to rotate the stand member. The rotating member also includes a locking mechanism configured to fix a rotational position of the stand member in a locked state when the holding part is opened to a first angle equal to or greater than a second angle and the stand member has been rotated to a position where the stand member is configured to brace the attached mobile device.

Embodiments also include a hinged support and stand apparatus having a bracing means and a rotating means attached to the bracing means and a holding means configured to removably attach a mobile device thereto. The rotating means is configured to coaxially rotate the bracing means and the rotating means. The rotating means includes a first rotating means for rotating the rotating means and a second rotating means for rotating the bracing mean. The rotating means also includes a locking means for locking the bracing means, where the locking means is configured to fix a rotational position of the bracing means in a locked state when the holding means is opened to a first angle equal to or greater than a second angle and the bracing means has been rotated to a position where the bracing means braces the attached mobile device.

Embodiments further include a hinged support and stand system, having a mobile device and a keyboard body configured to include a plurality of input keys. The system further includes a stand and a rotating member attached to the stand and a holding part configured to removably attach the mobile device thereto. The rotating member is configured to coaxially rotate the stand and the rotating member. The rotating member includes a first rotating mechanism configured to rotate the rotating member and a second rotating mechanism configured to rotate the stand member. The rotating member also includes a locking mechanism configured to fix a rotational position of the stand member in a locked state when the holding part is opened to a first angle equal to or greater than a second angle and the stand member has been rotated to a position where the stand member is configured to brace the attached mobile device.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 13A and 13B are perspective views of the cam mechanism of FIG. 12 according to an embodiment of the disclosure.

FIG. 22 is a perspective view illustrating a closed state where the stand member is returned to its initial position according to an embodiment of the disclosure.

DETAILED DESCRIPTION OF THE EMBODIMENTS

Figure 1:
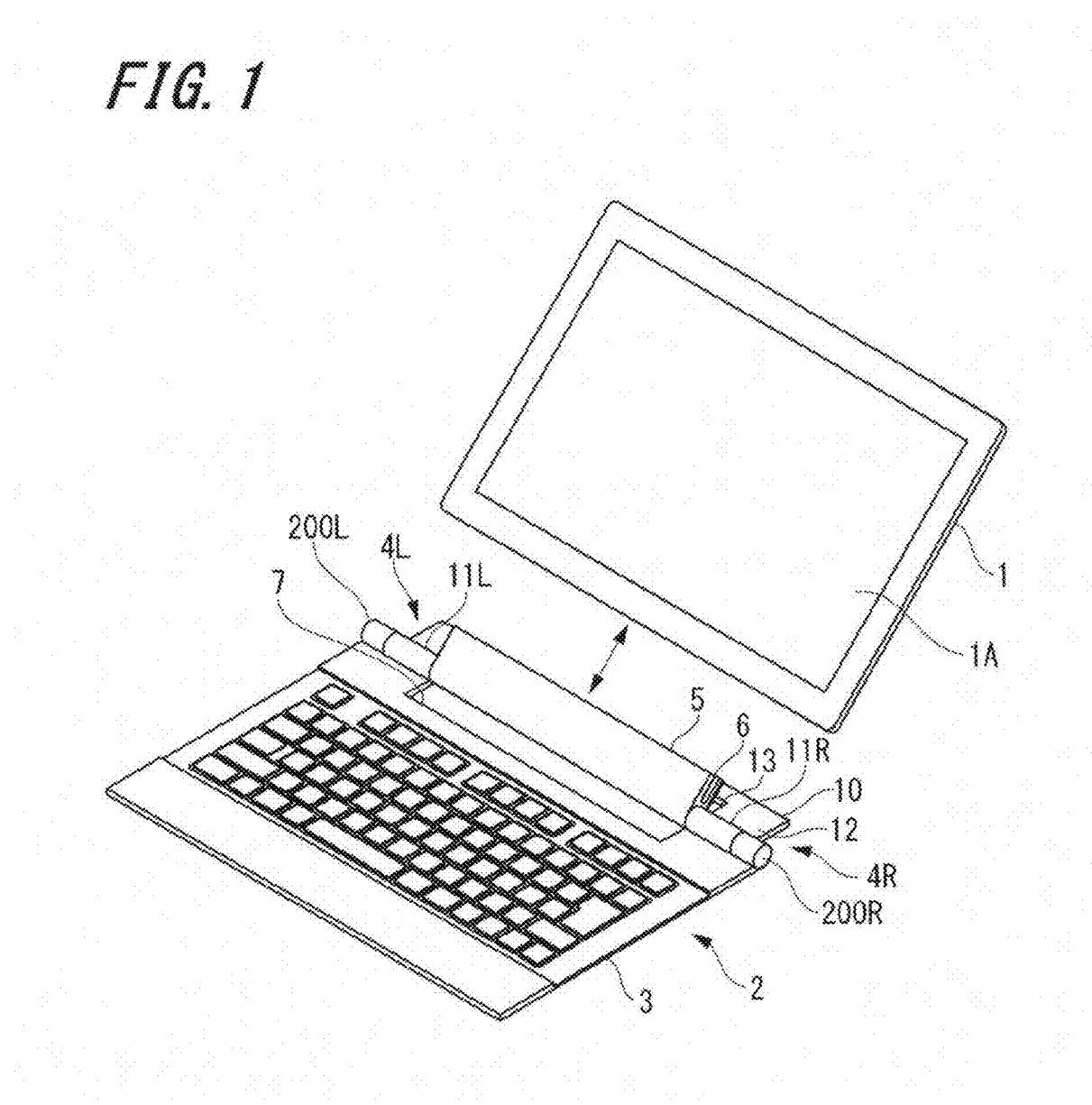
FIG. 1 is an illustrative view of a tablet terminal and a keyboard device according to an embodiment of the disclosure.

Referring now to the drawings, wherein like reference numerals designate identical or corresponding parts throughout the several views.

FIG. 1 is an illustrative view of tablet terminal 1 and keyboard device 2 according to an embodiment of the disclosure. As shown in FIG. 1, in certain embodiments, keyboard device 2 is configured so that mounting and removal of tablet terminal 1 is possible. Tablet terminal 1 includes touch screen 1A. Further, tablet terminal 1, for example, may include portable apparatuses, such as, tablet computers, mobile phone tablets, personal data assistant devices (PDAs), or other mobile devices. Keyboard device 2 is equipped with keyboard main body 3 which is configured to include a plurality of input keys, holding part 5 which is configured to mount and hold tablet terminal 1, stand member 10, and hinge structure 4R, 4L which is configured to enable rotation between tablet terminal 1, keyboard device 2, holding part 5 and stand member 10.

Holding part 5, stand member 10, and hinge structure 4R, 4L are arranged on the same rotating shaft using shaft 190 (see FIG. 6) discussed later. In other words, holding part 5 and stand member 10 are rotated on the same rotating shaft along the same axis. The shape of a cross section in a radial direction from the rotating shaft of holding part 5 is substantially U-shaped. Tablet terminal 1 is inserted in groove part 6 by which the U-shaped space of holding part 5 may extend and form in a rotating shaft axial direction. Further, cutout 7 is formed in holding part 5 of keyboard main body 3. Thus, when holding part 5 (tablet terminal 1) is in a closed state, holding part 5 can be in a completely closed state, without holding part 5 interfering with keyboard main body 3.

Stand member 10 includes cylindrical part 11R, 11L configured to connect with plate-shaped long flap 12 and both ends of long flap 12 in a rotating shaft direction. Cutout 13 is formed in long flap 12 corresponding to the size and shape of holding part 5 of keyboard main body 3. Thus, when stand member 10 is in a closed state in which holding part 5 (tablet terminal 1) is closed, stand member 10 will be in a completely closed state, and without stand member 10 interfering with holding part 5 (see FIG. 2).

Fixing member 200R, 200L is configured to fix or attach hinge structure 4R, 4L to keyboard main body 3. Hinge structure 4R, 4L includes inner-side holder 60R, 60L, cylindrical part 11R, 11L of stand member 10, and fixing member 200R, 200L.

Figure 2:
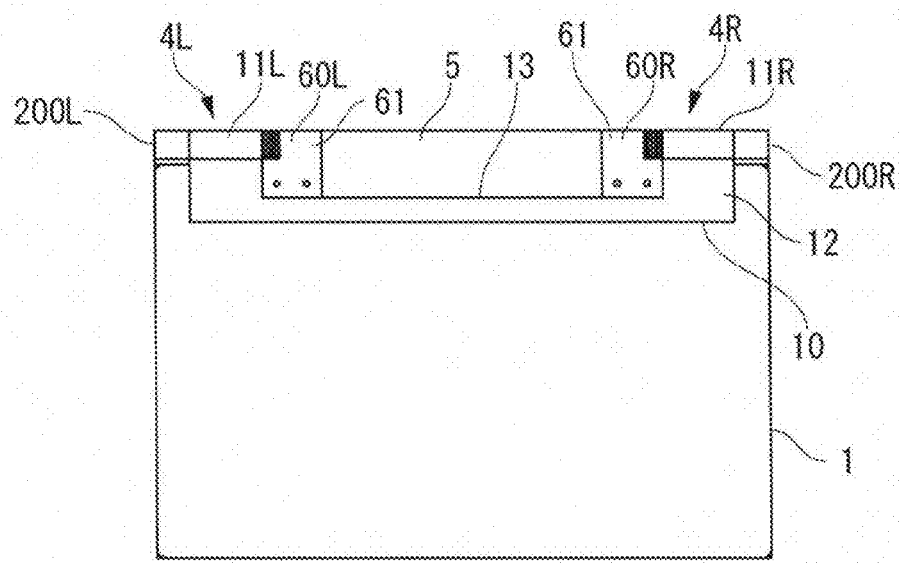
FIG. 2 is a plan view illustrating a state in which the tablet terminal is in a closed state with respect to the keyboard device according to an embodiment of the disclosure.

FIG. 2 is a plan view illustrating a state in which tablet terminal 1 is in a closed state according to an embodiment of the disclosure. FIG. 2 shows a state in which tablet terminal 1 is in a completely closed position. In certain embodiments, plate-like-parts 61 of inner-side holder 60R, 60L are fastened by both ends of holding part 5 using screws or similar fasteners. In the closed state in which tablet terminal 1 is closed towards keyboard main body 3, plate-like-parts 61 is configured to be concealed from a user.

Figure 3:
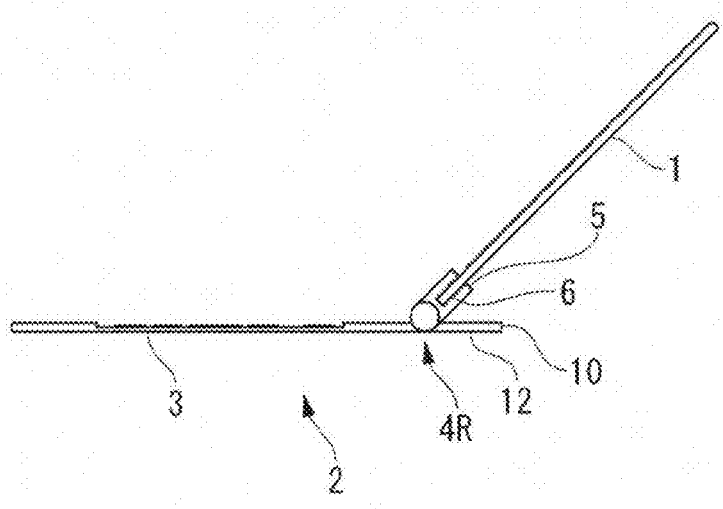
FIG. 3 is a side view illustrating a state in which the tablet terminal is in an opened state with respect to the keyboard device according to an embodiment of the disclosure.

FIG. 3 is a side view illustrating a state in which tablet terminal 1 is in an opened state with respect to keyboard device 2 according to an embodiment of the disclosure. FIG. 3 shows the state in which tablet terminal 1 is opened during operational use. In FIG. 3, tablet terminal 1 is open at or near an angle of 135 degrees with respect to keyboard main body 3 via hinge structure 4R, 4L. In this instance, stand member 10 can be in the state rotated to the position (for example, 180 to 185 degrees) for functioning as a stand, and supports the position of tablet terminal 1. In addition, in subsequent description, a position for stand member 10 to function as a stand is denoted as "stand position."

Figure 4A:
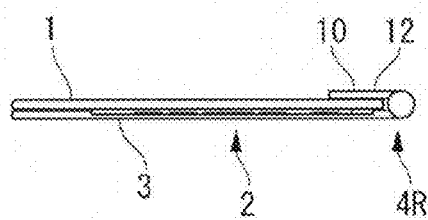
FIGS. 4A to 4E are side views illustrating various positions of a stand member with respect to the tablet terminal and the keyboard device from closed to opened states according to an embodiment of the disclosure.
Figure 4B:
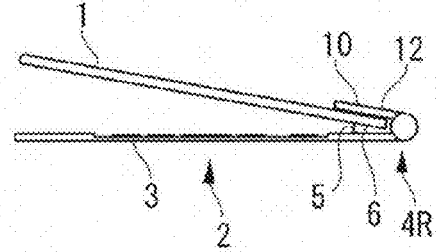
Figure 4C:
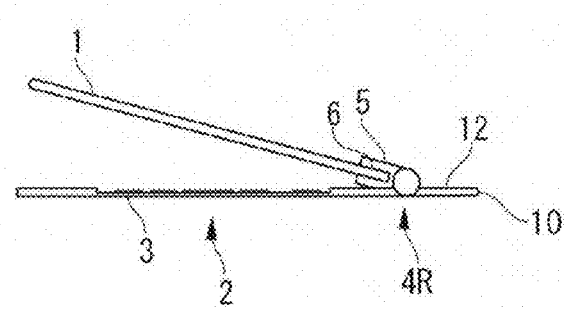
Figure 4D:
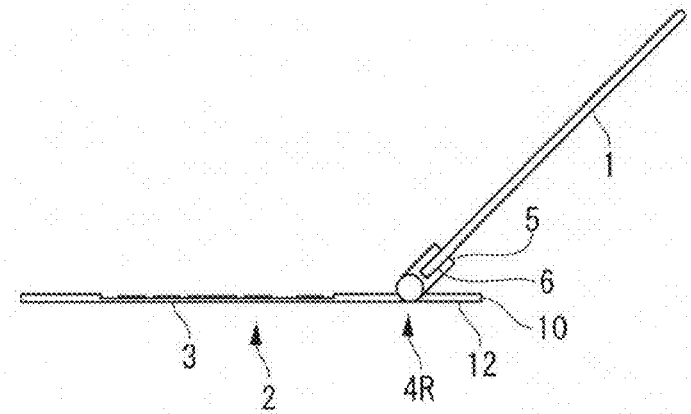
Figure 4E:
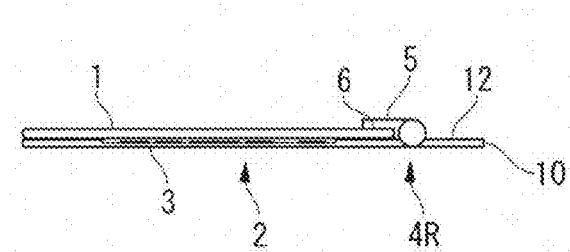

FIGS. 4A to 4E are side views illustrating various positions of stand member 10 with respect to tablet terminal 1 and keyboard device 2 from closed to opened states according to an embodiment of the disclosure. FIG. 4A is a side view which shows the state in which tablet terminal 1 is completely closed and stand member 10 is fully retracted flush with table terminal 1. FIG. 4B is a side view which shows a state when a user lifts an upper side of tablet terminal 1 with the stand member 10 retracted flush with tablet terminal 1. FIG. 4C is a side view in which stand member 10 shows the state in which stand member 10 is fully opened immediately after a user lifts the upper side of tablet terminal 1 and tablet terminal 1 is at a predetermined angle, for example at or near 30 degrees. FIG. 4D is a side view which shows the position of tablet terminal 1 in an operational position for the user, for example, 135 degrees. FIG. 4E is a side view of a ready state in which stand member 10 remains fully opened while a user has closed tablet terminal 1.

In operation, (1) when a user opens tablet terminal 1 in the state (see FIG. 4A) in which tablet terminal 1 along with holding part 5 of keyboard device 2 are mounted is initially closed, tablet terminal 1 along with holding part 5 will rotate about an axis of shaft 190 (see FIG. 6) of hinge structure 4R, 4L. At this time, stand member 10 is provided integrally with hinge structure 4R, 4L will also rotate about the same axis in conjunction with tablet terminal 1 (see FIG. 4B). By such a configuration, the user can save the effort of opening stand member 10. Next, (2) when tablet terminal 1 reaches a specific angle (an $i^{th}$ angle; for example, 30 degrees) with respect to keyboard device 2, stand member 10 is configured to rotate automatically and to reach a position (for example, 185 degrees) of fully open. At this time, stand member 10 is not locked but is in a state in which it can be rotated or oriented by a user (see FIG. 4C). Then, (3) when tablet terminal 1 is opened to an angle of 90 degrees or more, stand member 10 will be in a locked state, and stand member 10 will be in the state which is effective for stably supporting both tablet terminal 1 and keyboard device 2. Therefore, in this state keyboard device 2 and tablet terminal 1 will not fall down or backwards due to the weight of tablet terminal 1. In this embodiment, the position of tablet terminal 1 can be adjusted from about 90 degrees to 135 degrees in the state by which stand member 10 remains locked (see FIG. 4D). Further, (4) when a user closes tablet terminal 1 by hand, as for stand member 10, the locked state will be released and stand member 10 may lose its effectiveness to support tablet terminal 1 in a retentive position or posture while still in a fully opened state (see FIG. 4E). (5) Finally, tablet terminal 1 is closed because a user returns stand member 10 to the initial position by hand (as shown in FIG. 4A).

Figure 5:
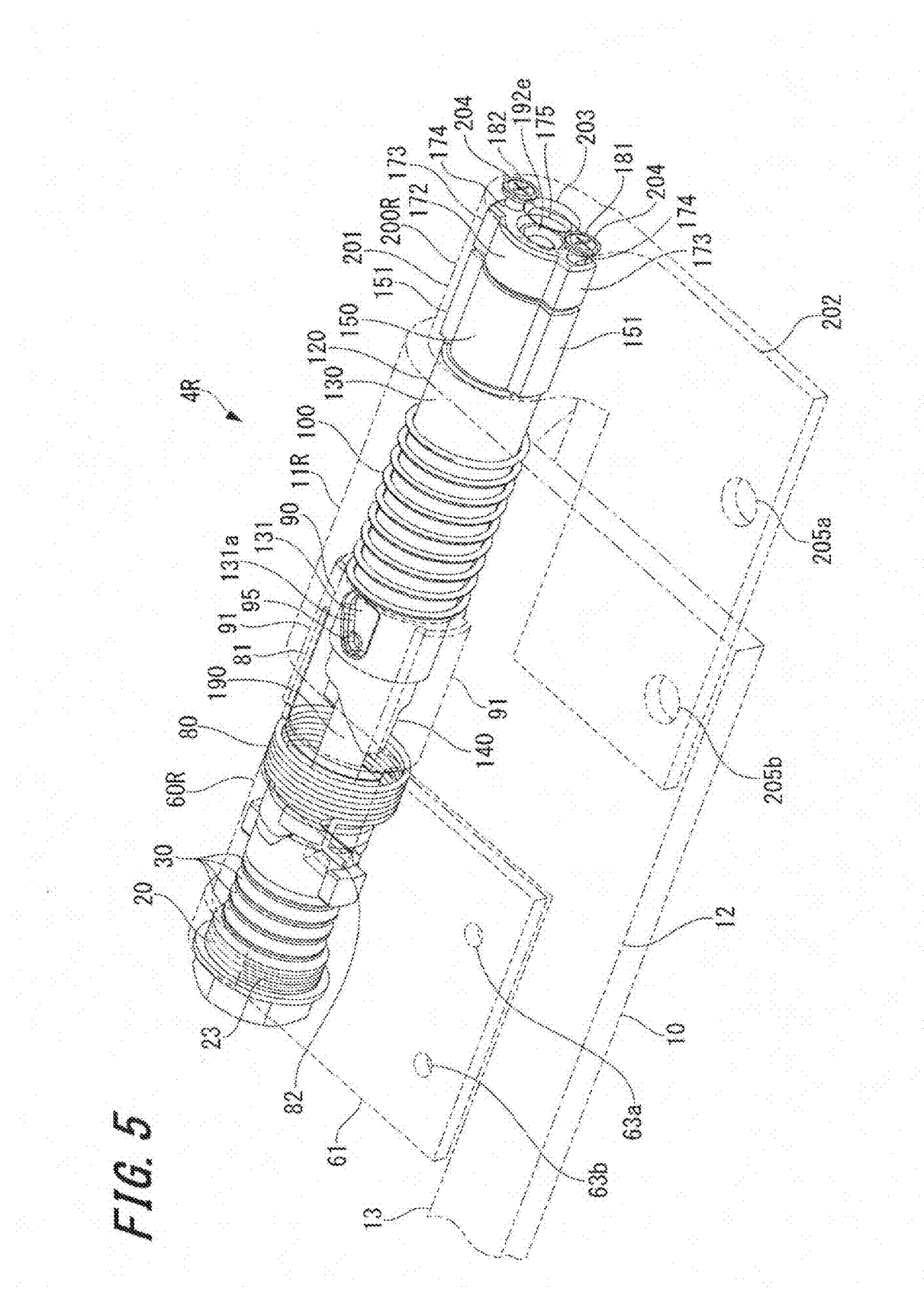
FIG. 5 is a schematic perspective view illustrating a hinge structure according to an embodiment of the disclosure.

FIG. 5 is a schematic perspective view illustrating a hinge structure 4R according to an embodiment of the disclosure. As shown in FIG. 1, keyboard device 2 equips both sides (namely, a position symmetrically across the center of keyboard device 2) of stand member 10 with hinge structure 4R, 4L. Hinge structure 4R, 4L is a symmetrical structure, and the basic structure is the same on each side. Therefore, hinge structure 4R is discussed in detail below and the detailed description of 4L of hinge structure 4R, 4L is omitted for simplicity.

The state shown in FIG. 5 is a state in which tablet terminal 1 is in a closed position (see FIG. 2), where plate-like-part 61 of inner-side holder 60R, flap 12 of stand member 10, and plate-like-part 202 of fixing member 200R exist in the same plane, or are parallel. Hinge structure 4R is disposed in cylindrical part 11R of inner-side holder 60R and stand member 10, and the inside of cylindrical part 201 of fixing member 200R. In FIG. 5, inner-side holder 60R, stand member 10, and fixing member 200R are shown as dashed lines. Further, inner-side holder 60R is configured as a hollow cylinder (see FIG. 6). Part of the cylindrical outer peripheral surface of inner-side holder 60R comprises plate-like-part 61 extending in an approximately tangential direction from the cylindrical outer peripheral surface of inner-side holder 60R. Through-holes 63a, 63b are formed in plate-like-part 61.

Holding part 5 includes screw holes formed in a position corresponding to through-holes 63a, 63b of plate-like-part 61. Plate-like-part 61 and holding part 5 of inner-side holder 60R are configured to be fastened via screws or fasteners using through-holes 63a, 63b. Alternatively, a single screw-hole may be sufficient instead of through-holes 63a, 63b. Stand member 10 includes cylindrical part 11R, and flap 12 formed in approximately a tangential direction from cylindrical part 11R. Fixing member 200R may have cylindrical part 201 and plate-like-part 202 formed in an approximately tangential direction from cylindrical part 201. Through-holes 205a, 205b are formed in plate-like-part 202.

Keyboard main body 3 (see FIG. 1) includes screw holes formed in a position corresponding to through-holes 205a, 205b of plate-like-part 202. Plate-like-part 202 of fixing member 200R and keyboard main body 3 are fastened by screws using through-holes 205a, 205b. Alternatively, plate-like-part 202 may be fastened to any of the surfaces of keyboard main body 3, or a back surface thereof. Further, plate-like-part 202 is fastened at a midway position in the thickness direction of the side surface of keyboard main body 3. For example, plate-like-part 202 may be fastened to the inner frame of keyboard main body 3, and plate-like-part 202 and a fastening part of fixing member 200R may be covered with the external appearance components of the surface of keyboard main body 3, and a back surface. By this example, plate-like-part 202 and the fastening part of fixing member 200R are hidden from an exterior view, thereby, improving an external appearance. Alternatively, a single screw-hole may be sufficient instead of through-holes 205a, 205b. Through-hole 203 is formed along the axis of shaft 190 with fixing member 200R. Hereinafter, the components discussed above with regard to FIG. 5 also refer to FIG. 6 and comprise hinge structure 4R.

Figure 6:
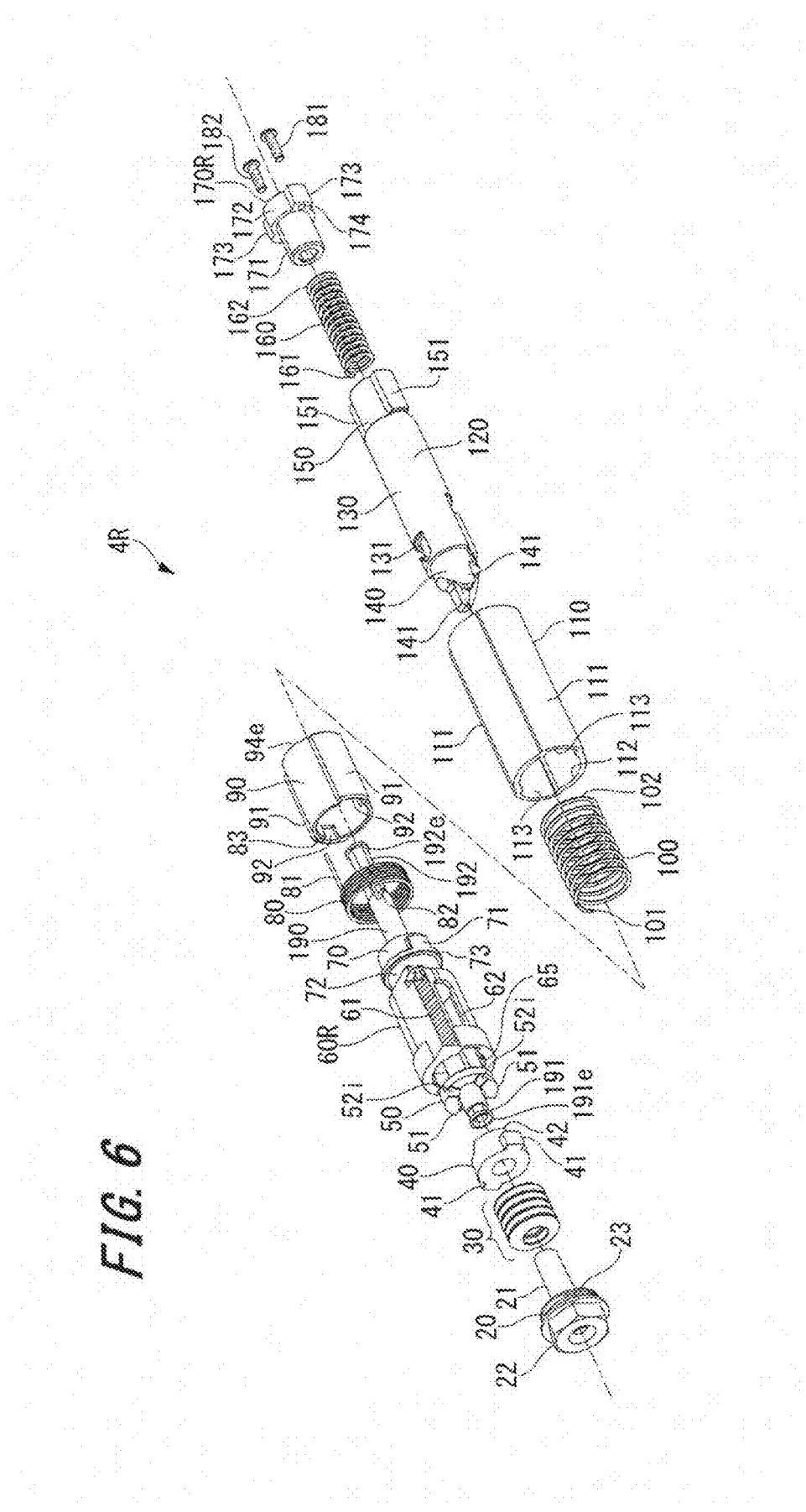
FIG. 6 is an exploded perspective view illustrating the hinge structure as shown in FIG. 5 according to an embodiment of the disclosure.

FIG. 6 is an exploded perspective view illustrating the hinge structure 4R as shown in FIG. 5 according to an embodiment of the disclosure. The oblique line part of FIG. 6 represents the cross section in A-A line of FIG. 8. Hinge structure 4R comprises cap 20, disk spring 30, inner side cam member 40, outer side cam member 50, inner-side holder 60R, torsion spring 80, starting circular-cylinder 90, coiled spring 100, cylinder 110, movable-side cam member 120, coiled spring 160, outer-side holder 170R and shaft 190. As for each of these components, shaft 190 is axially passed through except for cap 20, disk spring 30 and inner side cam member 40. As discussed above, inner-side holder 60R includes a cylindrical shape having a hollow inside area. Within inner-side holder 60R, outer side cam member 50, inner side cam member 40 and disk spring 30 are arranged sequentially from the outer side (with respect to a center other side) of keyboard main body 3. Cap 20 is cylindrical in shape, cylindrical part 21 has a diameter smaller than the cylindrical diameter of cap 20 and cylindrical part 21 is formed as one cylindrical bottom face.

Cylindrical part 21 of cap 20 is configured to axially pass through outer side cam member 50, inner side cam member 40 and disk spring 30. External thread 23 disposed on a part of an outer peripheral surface of cap 20 is screwed together by internal thread 65 disposed in an internal peripheral surface of inner-side holder 60R (see FIG. 7). Thus, inner-side holder 60R and cap 20 is fastened. Head 22 of cap 20 is configured as a hexagon, for example, and may be used to rotationally fasten inner-side holder 60R and cap 20. Cap 20 and inner-side holder 60R may be fastened in the state for which disk spring 30 may be compressed (see FIG. 7). Outer side cam member 50 is a cylinder disposed along the axis of shaft 190. Outer side cam member 50 includes two convex parts 51 in a surface facing inner side cam member 40. On the surface facing inner side cam member 40 of outer side cam member 50, convex part 51 is formed such that the circumferential direction on the surface is followed.

Convex part 51 includes a plane vertical to the axis of shaft 190. Moreover, slope $52i$ is formed in a part of convex part 51. In the state with which cap 20 is fastened by inner-side holder 60R, a surface opposite side of the surface in which convex part 51 of outer side cam member 50 was formed, contacts to a contact surface (not shown) inside inner-side holder 60R.

Rectangular tube part 191 is formed in the vicinity of edge part 191e of shaft 190, and an angle hole corresponding to rectangular tube part 191 is formed in outer side cam member 50. Rectangular tube part 191 of shaft 190 is inserted into outer side cam member 50, and edge part 191e of shaft 190 is crimped. Thus, outer side cam member 50 is fastened by edge part 191e in the vicinity of shaft 190.

Inner side cam member 40 is formed as a cylindrical shape about the axis of shaft 190. Inner side cam member 40 may have two convex parts 41 formed in the circumferential direction of an outer peripheral surface by a predetermined interval spacing (for example, 180 degrees), and convex part 42 including two opposing but convergent surfaces which coincide with two surfaces in outer side cam member 50 (see FIG. 10).

In some embodiments, on the surface facing outer side cam member 50 of inner side cam member 40, convex part 42 are formed so that the circumferential direction is followed. Convex part 42 has a plane vertical to the axis of shaft 190. Moreover, slope 43i is formed in a part of convex part 42 (see FIG. 7). In the state with which cap 20 is fastened by inner-side holder 60R, the surface in which convex part 42 of inner side cam member 40 is formed, and the surface in which convex part 51 of outer side cam member 50 is formed coincide and fit together (see FIG. 7).

Inner-side holder 60R includes two guide grooves 62 disposed proximal to the surface where cap 20 is inserted. Guide grooves 62 is formed or configured at a predetermined interval (for example, 180 degrees) and cut away in the circumferential direction in the same direction as the axial direction of shaft 190. Convex part 41 of inner side cam member 40 may rest in guide groove 62 of inner-side holder 60R. Inner-side holder 60R includes cylindrical part 72 and cam part 70 formed at a front-end of cylindrical part 72 in the surface on the opposite side to a side where cap 20 is inserted (see FIG. 7). The diameter of cylindrical part 72 is smaller than the cylindrical diameter of inner-side holder 60R. Cam part 70 is a cylinder and convex part 74 is formed as shown with a cylindrical inside in FIG. 13A. Convex part 74 formed in the cylindrical inside of inner-side holder 60R is configured to function as a cam. In other words, convex part 74 inside cam part 70 is contacted or engaged with convex part 141 of cam part 140 formed in movable-side cam member 120. Two convex parts 71 which extend in the same direction as the axial direction of shaft 190 is formed in the outer peripheral surface of cam part 70. Two convex parts 71 of cam part 70 is fitted into two grooves 92 formed in starting circular-cylinder 90.

As for inner-side holder 60R, collar portion 73 is formed in the connection part of cylindrical part 72 and cam part 70. The main-body part of torsion spring 80 is arranged between the cylindrical end surface and collar portion 73 which are parts of inner-side holder 60R. A metal is used for torsion spring 80. Torsion spring 80 has edge part 81 which extends toward starting circular-cylinder 80 from the main-body part, and edge part 82 which extends toward inner-side holder 60R side.

Edge part 81 of torsion spring 80 is inserted into hole part 83 formed in the surface facing torsion spring 80 of starting circular-cylinder 90. Edge part 82 of torsion spring 80 includes a front-end which is formed as hook shape. Edge part 82 of torsion spring 80 is inserted into and latched by concave-shaped latching part 66 formed in inner-side holder 60R (see FIG. 9).

Starting circular-cylinder 90 includes two projecting strips 91 formed with predetermined interval spacing (for example, 180 degrees) in the circumferential direction of the outer peripheral surface. Projecting strips 91 may extend in the same direction as the axial direction of shaft 190. Groove 92 is formed in the inner peripheral side of projecting strip 91. In the outer peripheral surface of cylinder 110, two projecting strips 111 are formed with a predetermined interval (for example, 180 degrees) in the circumferential direction extending in the same direction as the axial direction of shaft 190. Grooved line 113 is formed in internal peripheral surface 112 of projecting strip 111. The diameter of cylinder 110 is larger than the diameter of starting circular-cylinder 90. Inside cylinder 110 includes coiled spring 100 which is arranged to align with starting circular-cylinder 90. One edge part 101 of coiled spring 100 is contacted at edge part 94e of starting circular-cylinder 90, and other edge part 102 is contacted at a predetermined location in cylinder 110 (see FIG. 11B). A metal is used for coiled spring 100. A metal may also be used for cylinder 110 to prevent abrasion.

Movable-side cam member 120 includes main-body part 130, cam part 140 and engaging part 150. Main-body part 130 is a cylinder about an axis which coincides with the axis of shaft 190, and a guide groove 131 is formed in the cylindrical outer peripheral surface. Cam part 140 of main-body part 130 is provided in the surface of side facing cam part 70 of inner-side holder 60R. Two convex parts 141 are formed in cam part 140, and convex parts 141 are configured to contact or engage convex part 74 of cam part 70.

Engaging part 150 is provided in the surface on the opposite side of cam part 140 of main-body part 130, and may have a cylindrical shape about an axis which coincides with the axis of shaft 190. Engaging part 150 includes two projecting strips 151 having a predetermined interval spacing (for example, 180 degrees) in the circumferential direction of the outer peripheral surface extending in the same direction as the axial direction of shaft 190. Projecting strips 151 is configured to engage and disengage cylinder 110 when in a locked state of stand member 10 and the lock release state, respectively, as shown to FIG. 4D.

Coiled spring 160 is arranged to apply a force to main-body part 130 of movable-side cam member 120, and coiled spring 160 is disposed inside engaging part 150. One edge part 161 of coiled spring 160 is disposed at a predetermined location with regard to main-body part 130 (see FIG. 14), and other edge part 162 is disposed at the end surface of cylindrical part 171 of outer-side holder 170R. A metal is used for coiled spring 160.

Outer-side holder 170R includes cylindrical part 172 having a larger diameter than the diameter of cylindrical part 171. Cylindrical part 171 of outer-side holder 170R is axially passed through by engaging part 150 (see FIG. 14). Rectangular tube part 192 is formed in the vicinity of edge part 192e of shaft 190, and angle hole 175 is configured to engage rectangular tube part 192, and is formed in cylindrical part 171,172 of outer-side holder 170R (see FIG. 14). Rectangular tube part 192 of shaft 190 is inserted into cylindrical part 171,172 of outer-side holder 170R, and edge part 192e of shaft 190 is crimped. Thus, edge part 192e in the vicinity of shaft 190 is fastened by outer-side holder 170R inserted into fixing member 200R. Moreover, cylindrical part 172 of outer-side holder 170R includes two convex parts 173 formed in the circumferential direction of the outer peripheral surface by a predetermined interval. Screw-hole 174 is formed in these two convex parts 173, respectively. Outer-side holder 170R and 200R is fastened together by screws 181, 182 using screw-holes 174 in outer-side holder 170R in alignment with screw-holes 204 in fixing member 200R (see FIG. 5, FIG. 14).

Figure 7:
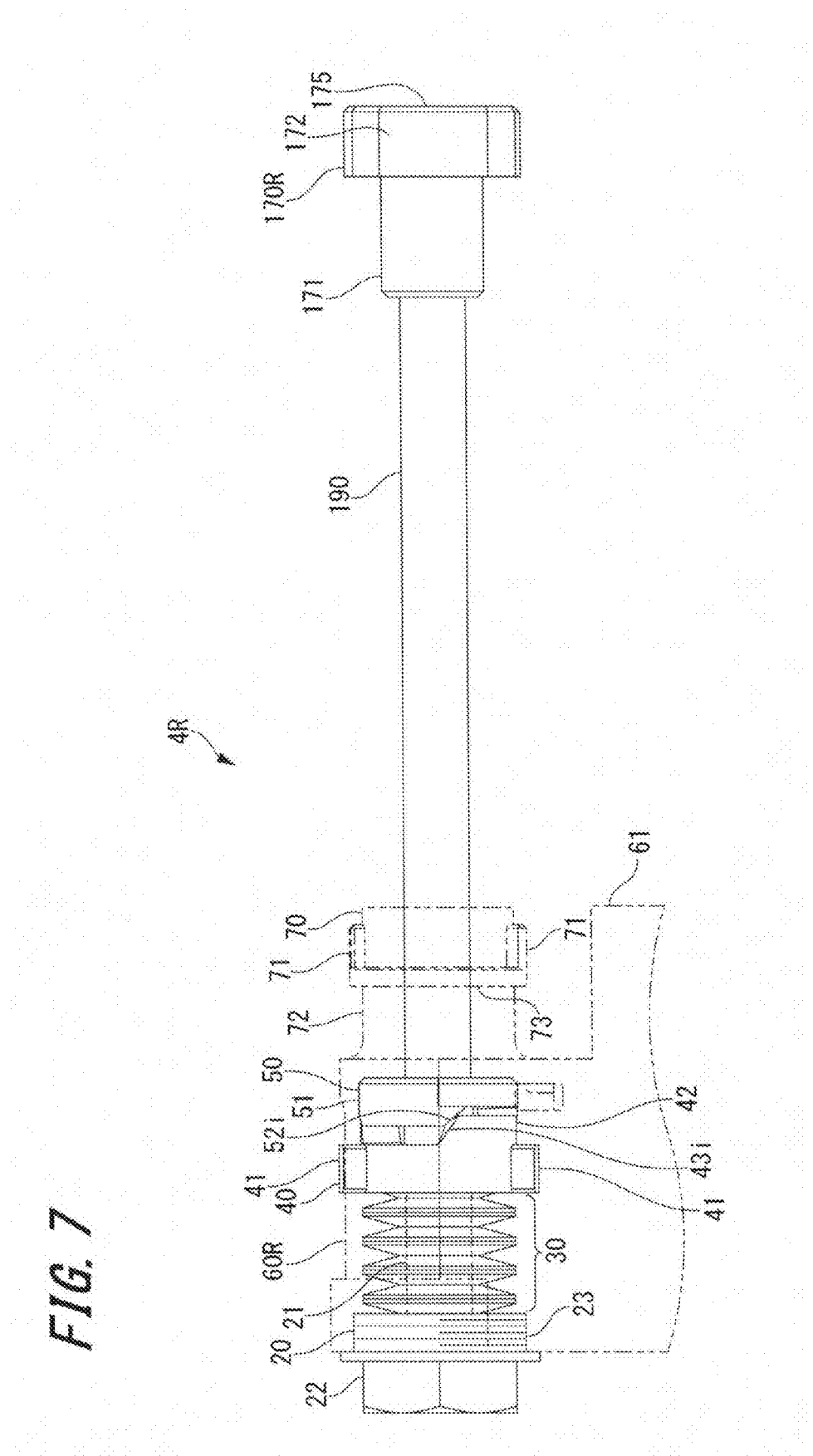
FIG. 7 is a side view illustrating an internal part of the hinge structure according to an embodiment of the disclosure.

FIG. 7 is a side view illustrating an internal part of the hinge structure 4R according to an embodiment of the disclosure. FIG. 7 shows the torque generation structure between tablet terminal 1 (inner holder) and a keyboard device 2. In FIG. 7, the components considered to describe the torque generation structure are shown, and description of other components is omitted as dashed lines. As above-mentioned, disk spring 30 is compressed within inner-side holder 60R in the state where cap 20 is fastened. Therefore, inner side cam member 40 is in a state of press-contact to outer side cam member 50. Here, when tablet terminal 1 is opened, inner-side holder 60R is fastened with holding part 5 and caused to rotate with the rotation of holding part 5 which holds tablet terminal 1. Convex part 41 of inner side cam member 40 is latched by guide groove 62 of inner-side holder 60R and inner side cam member 40 is forcibly pressed against outer side cam member 50 by disk spring 30. Thus, when inner-side holder 60R rotates, high rotational torque is generated and applied to inner side cam member 40 and outer side cam member 50. Here, as mentioned above, outer side cam member 50 is fixed to shaft 190 which is fixed to outer-side holder 170R. Therefore, inner side cam member 40 may rotate, while the surface of convex part 42 and slope 43i of inner side cam member 40 may slide along the surface in which convex part 51 and slope 52i of outer side cam member 50.

A rotational force of inner-side holder 60R is transmitted to starting circular-cylinder 90 (illustration was omitted in FIG. 7) through convex part 71 of cam part 70. Slope 43i of inner side cam member 40 and slope 52i of outer side cam member 50 may contact in the state in which the opening angle (rotation angle of inner-side holder 60R) of tablet terminal 1 receives the pushing force from disk spring 30 at or near 0 degrees. Therefore, if the opening angle of the tablet terminal 1 is around 0 degrees, a drawing-in torque is generated. Further, with an opening angle other than that which slope 43i and slope 52i do not contact, the position at the time of stopping rotation of inner-side holder 60R is maintained by the pushing force from disk spring 30.

Figure 8:
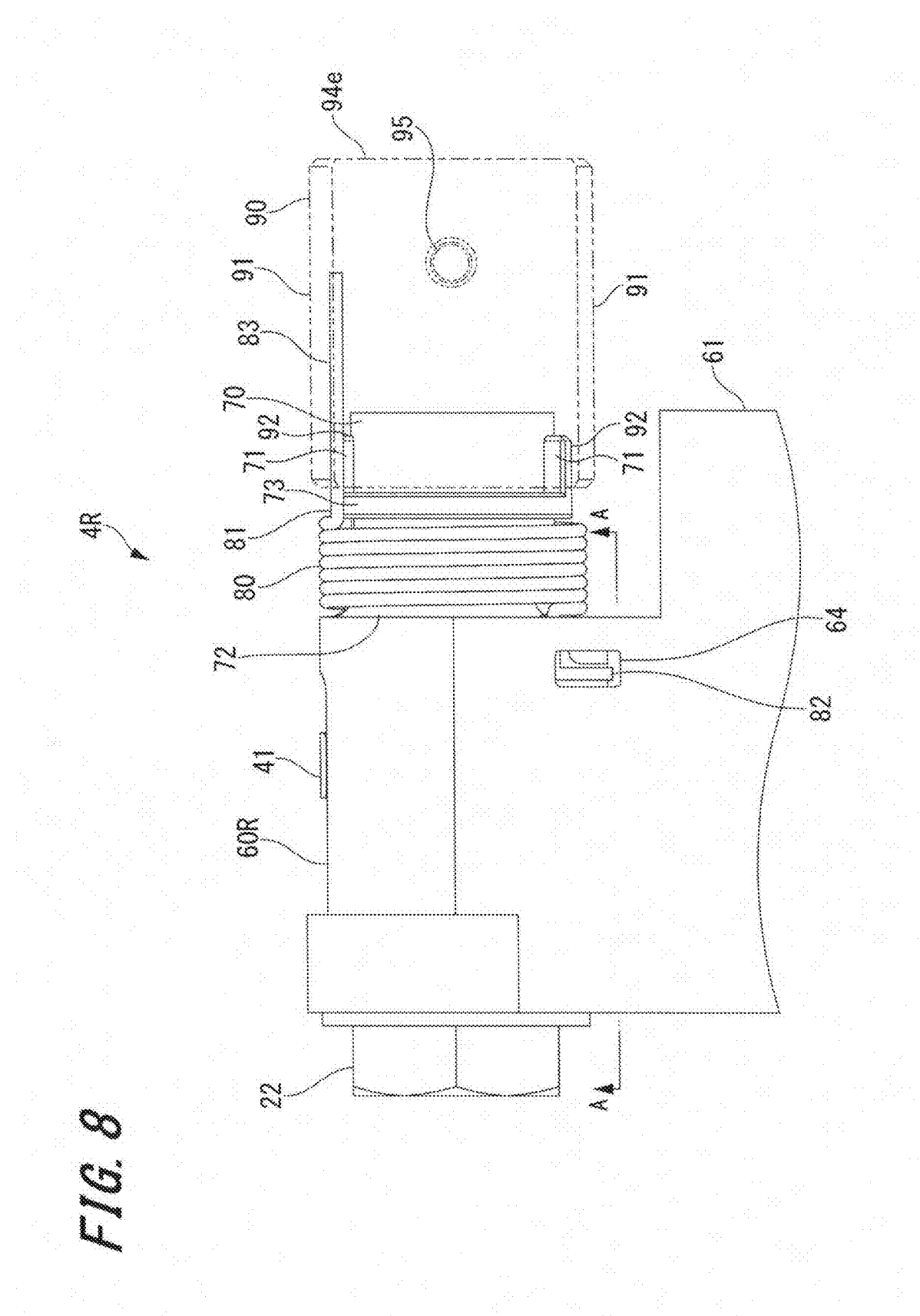
FIG. 8 is an illustrative view of a torque generation structure between the tablet terminal and a stand member according to an embodiment of the disclosure.

FIG. 8 is an illustrative view of a torque generation structure between tablet terminal 1 (inner holder) and stand member 10 according to an embodiment of the disclosure. FIG. 8 shows a fitting state of groove 92 of starting circular-cylinder 90, and convex part 71 of inner-side holder 60R. In FIG. 8, the components considered to describe the torque generation structure are shown, and description of other components is omitted. As demonstrated with reference to FIG. 6, one edge part 81 of torsion spring 80 is inserted into hole part 83 formed in the surface facing torsion spring 80 of starting circular-cylinder 90, other edge part 82 is inserted into and latched by latching part 66 formed in inner-side holder 60R (see FIG. 9). Torsion spring 80 opens starting circular-cylinder 90, and is configured to apply a constant biasing force to starting circular-cylinder 90 in the rotation direction. Moreover, starting circular-cylinder 90 is fitted into cylinder 110 and inserted in the rotation direction while being configured to connect to stand member 10. Therefore, if starting circular-cylinder 90 rotates, stand member 10 will also rotate. However, starting circular-cylinder 90 cannot necessarily always rotate. In other words, starting circular-cylinder 90 is configured to rotate only when the fitting state of groove 92 of starting circular-cylinder 90 and convex part 71 of inner-side holder 60R is released. Through-hole 64 is used to access or facilitate the engagement of latching edge part 82 of torsion spring 80 in latching part 66.

Figure 9:
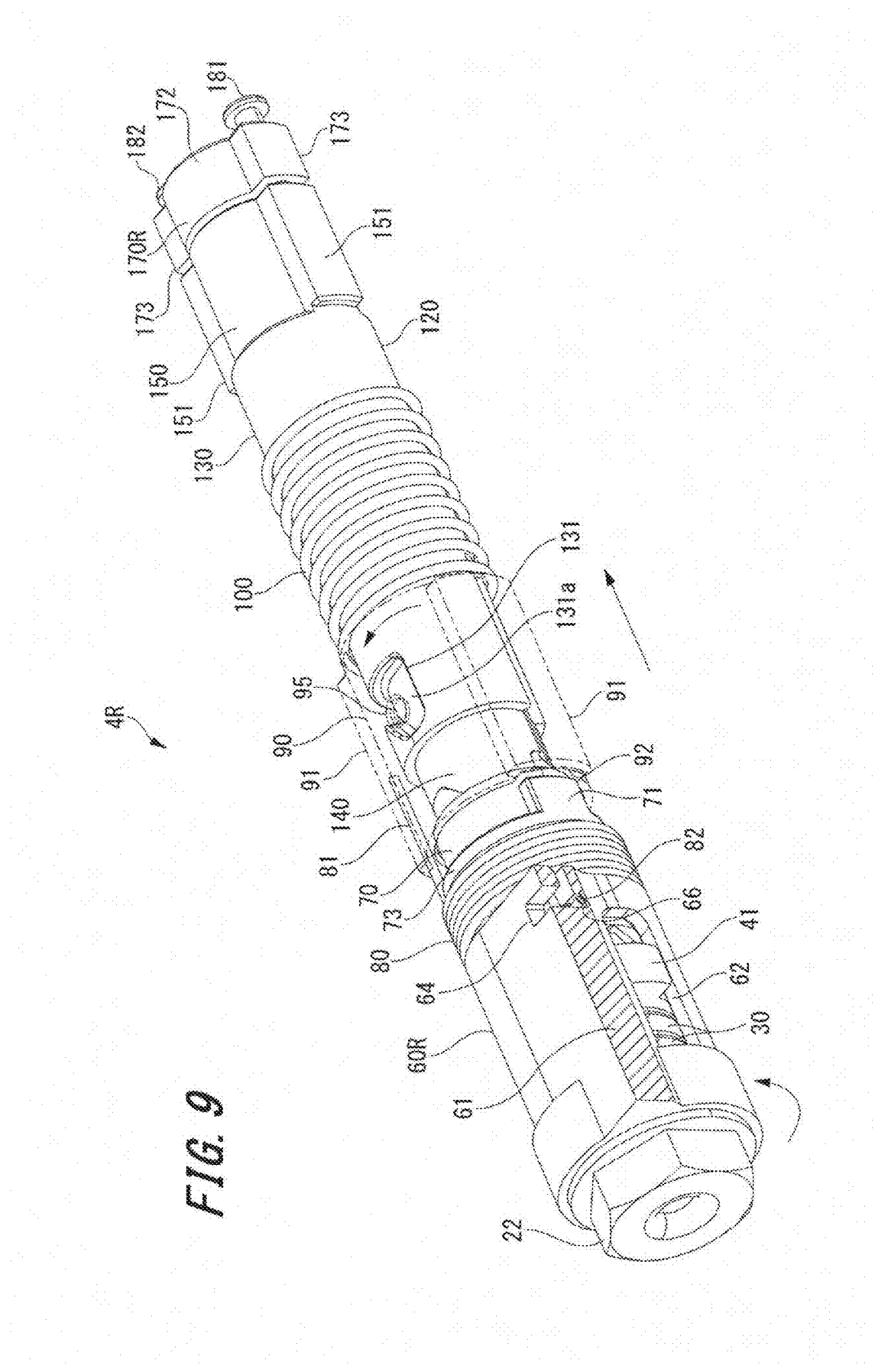
FIG. 9 is a perspective view illustrating a fitting state in which an inner holder and a starting circular-cylinder are released according to an embodiment of the disclosure.

FIG. 9 is a perspective view illustrating a fitting state in which inner-side holder 60R and starting circular-cylinder 90 are released according to an embodiment of the disclosure. FIG. 9 shows the state of the instant when the fitting state of groove 92 when starting circular-cylinder 90 and convex part 71 of inner-side holder 60R are released. The oblique line part of FIG. 9 represents the cross section in the A-A line of FIG. 8. Protrusion 95 is provided in the internal peripheral surface of starting circular-cylinder 90. Further, guide groove 131 is formed and configured to guide protrusion 95 along the outer peripheral surface of main-body part 130 of movable-side cam member 120. Guide groove 131 is comprised of first guide groove portion 131a, second guide groove portion 131b (see FIG. 10), and third guide groove portion 131c (see FIG. 10). Although first guide groove portion 131a is a groove formed along the axial direction of movable-side cam member 120, first guide groove portion 131a includes a diagonal edge with respect to the axial direction. First guide groove portion 131a has a narrow width at one side of movable-side cam member 120, and the other parallel side is comparably larger in width.

When the opening angle of tablet terminal 1 is at or near 0 degrees with respect to the keyboard device 2, protrusion 95 of starting circular-cylinder 90 is located in first guide groove portion 131a. Second guide groove portion 131b is a groove configured to connect with first guide groove portion 131a, and is formed along the circumferential direction (see FIG. 10). Third guide groove portion 131c is a groove configured to connect with first guide groove portion 131a, and is formed along the axial direction of movable-side cam member 120 (see FIG. 10). Third guide groove portion 131c includes a groove where protrusion 95 moves when stand member 10 is in a locked state.

When tablet terminal 1 (inner-side holder 60R) starts rotation (arrow rotational direction of FIG. 9) from at or near a 0 degrees opening angle, starting circular-cylinder 90 rotates through convex part 71 of inner-side holder 60R. At this time, protrusion 95 of starting circular-cylinder 90 is guided along first guide groove portion 131a. Starting circular-cylinder 90 is biased by the opening direction in (the arrow axial direction of FIG. 9). Therefore, starting circular-cylinder 90 rotates, while protrusion 95 contacts into the downstream diagonal part (edge) of a rotation direction along first guide groove portion 131a. Thus, starting circular-cylinder 90 is translated to the other side (the arrow axial direction of FIG. 9) of inner-side holder 60R, while rotating.

Furthermore, rotation of inner-side holder 60R will release the fitting state of groove 92 of starting circular-cylinder 90, and convex part 71 of inner-side holder 60R. Since the spring twist is formed extended in edge part 81 of torsion spring 80, even if convex part 71 is freed from groove 92, the state by which edge part 81 of torsion spring 80 is inserted in hole part 83 of starting circular-cylinder 90 is maintained. Therefore, starting circular-cylinder 90 starts rotation with torsion spring 80 at the same time a fitting state is released. As a result, stand member 10 rotates automatically and opens. In certain embodiments, when the opening angle of tablet terminal 1 reaches a predetermined angle, for example, about 30 degrees, stand member 10 is configured to open automatically (see FIG. 4C).

Figure 10:
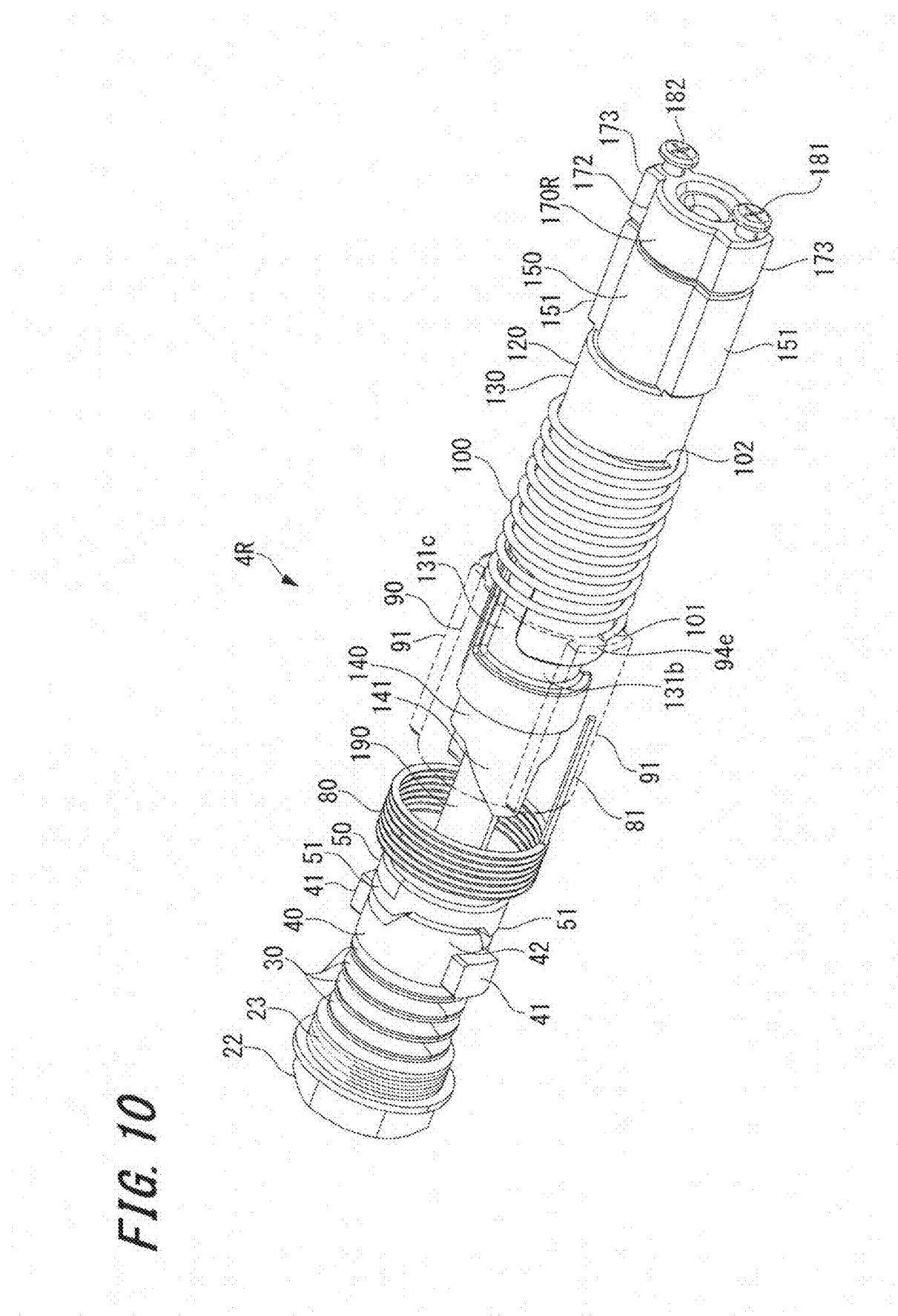
FIG. 10 is a perspective view illustrating as in FIG. 9 from an opposite side.

FIG. 10 is a perspective view illustrating as in FIG. 9 from an opposite side. When starting circular-cylinder 90 rotates automatically, protrusion 95 is configured to move along second guide groove portion 131b in the circumferential direction, and will run against third guide groove portion 131c formed in the axial direction of movable-side cam member 120. This state is equivalent to the state in which stand member 10 is rotated to about 185 degrees, for example. After stand member 10 opens to about 185 degrees automatically, when tablet terminal 1 (inner-side holder 60R) is further opened, protrusion 95 will follow the inside of third guide groove portion 131c relatively by a predetermined opening angle, and stand member 10 will be in a locked state.

Figure 11A:
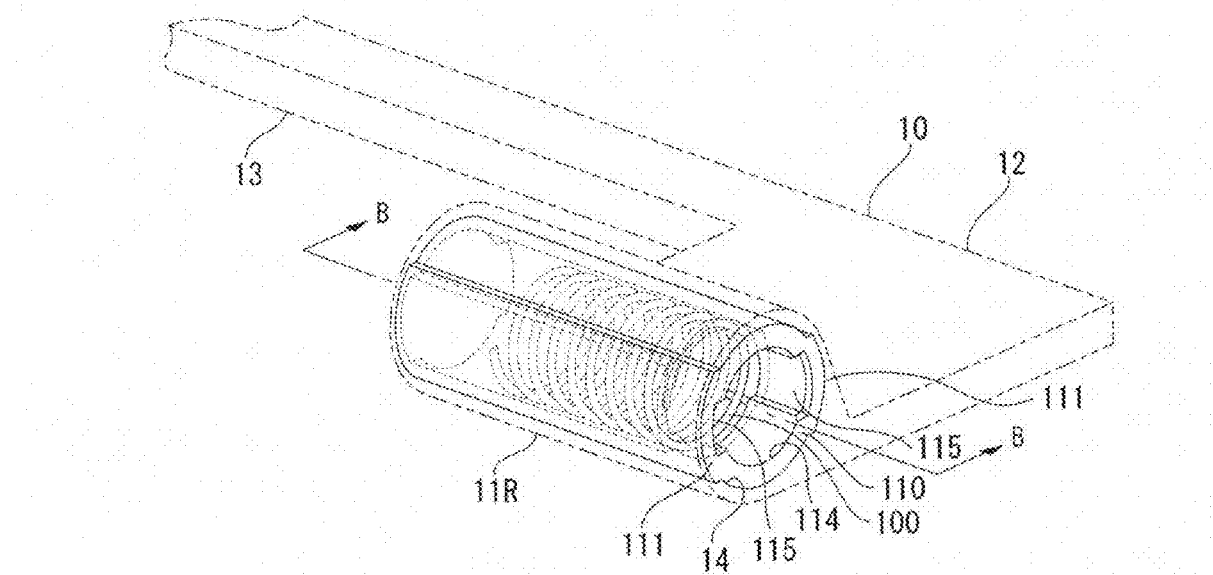
FIG. 11A is a perspective view illustrating the stand member, a cylinder and a coiled spring and 11B is a sectional view illustrating a cross-section of the cylinder along line B-B of FIG. 11A according to an embodiment of the disclosure.
Figure 11B:
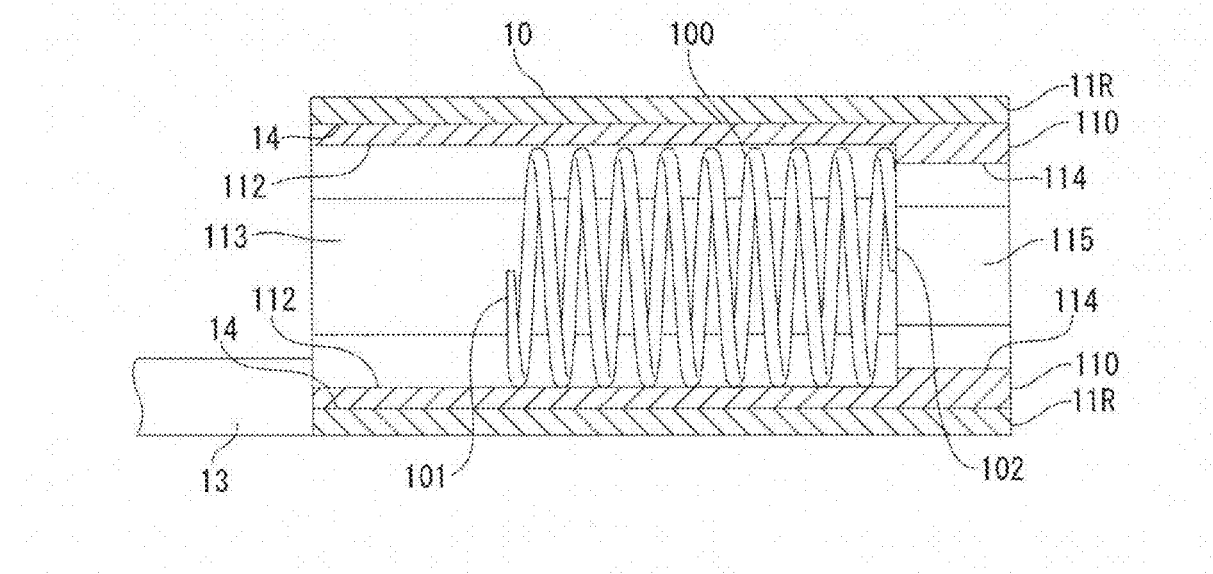

FIG. 11A is a perspective view illustrating stand member 10, cylinder 110 and coiled spring 100 and 11B is a sectional view illustrating a cross-section of cylinder 110 along line B-B of FIG. 11A according to an embodiment of the disclosure. Cylindrical part 11R of stand member 10 and cylindrical part 11R are shown as dashed lines. As shown to FIGS. 11A and 11B, through-hole 14 is configured to correspond to the outer peripheral surface of cylinder 110 and formed in the inside of cylindrical part 11R. Cylinder 110 is inserted into through-hole 14 of stand member 10. Cylinder 110 is configured to have an internal peripheral surface 112 (see FIG. 6) and internal peripheral surface 114 with an internal diameter smaller than the internal diameter of internal peripheral surface 112 (see FIG. 11B). Internal peripheral surface 114 of cylinder 110 includes two grooved lines 115 formed and configured to correspond to two projecting strips 111 provided in the outer peripheral surface. When projecting strip 151 of engaging part 150 is inserted and latched by each of grooved line 115 formed in internal peripheral surface 114 of cylinder 110, stand member 10 will not rotate with respect to keyboard device 2 (fixing member 200R). In other words, stand member 10 will be in a locked state. Thus, by the elastic force of coiled spring 80 causing the opening of stand member 10 make it possible to support keyboard device 2 and tablet terminal 1. Therefore, the locking mechanism of stand member 10, as discussed above, provides self-support of keyboard device 2 and tablet terminal 1. Further, projecting strip 151 of engaging part 150 fits into grooved line 115 of cylinder 110. In addition, as shown to FIG. 11B, edge part 102 of coiled spring 100 is configured to contact and press against internal peripheral surface 114 due to the internal-diameter difference between internal peripheral surface 112 of cylinder 110, and internal peripheral surface 114, discussed above. One edge part 101 is configured to contact and press against edge part 94e of starting circular-cylinder 90. Thus, starting circular-cylinder 90 is always biased at inner-side holder 60R side.

Figure 12:
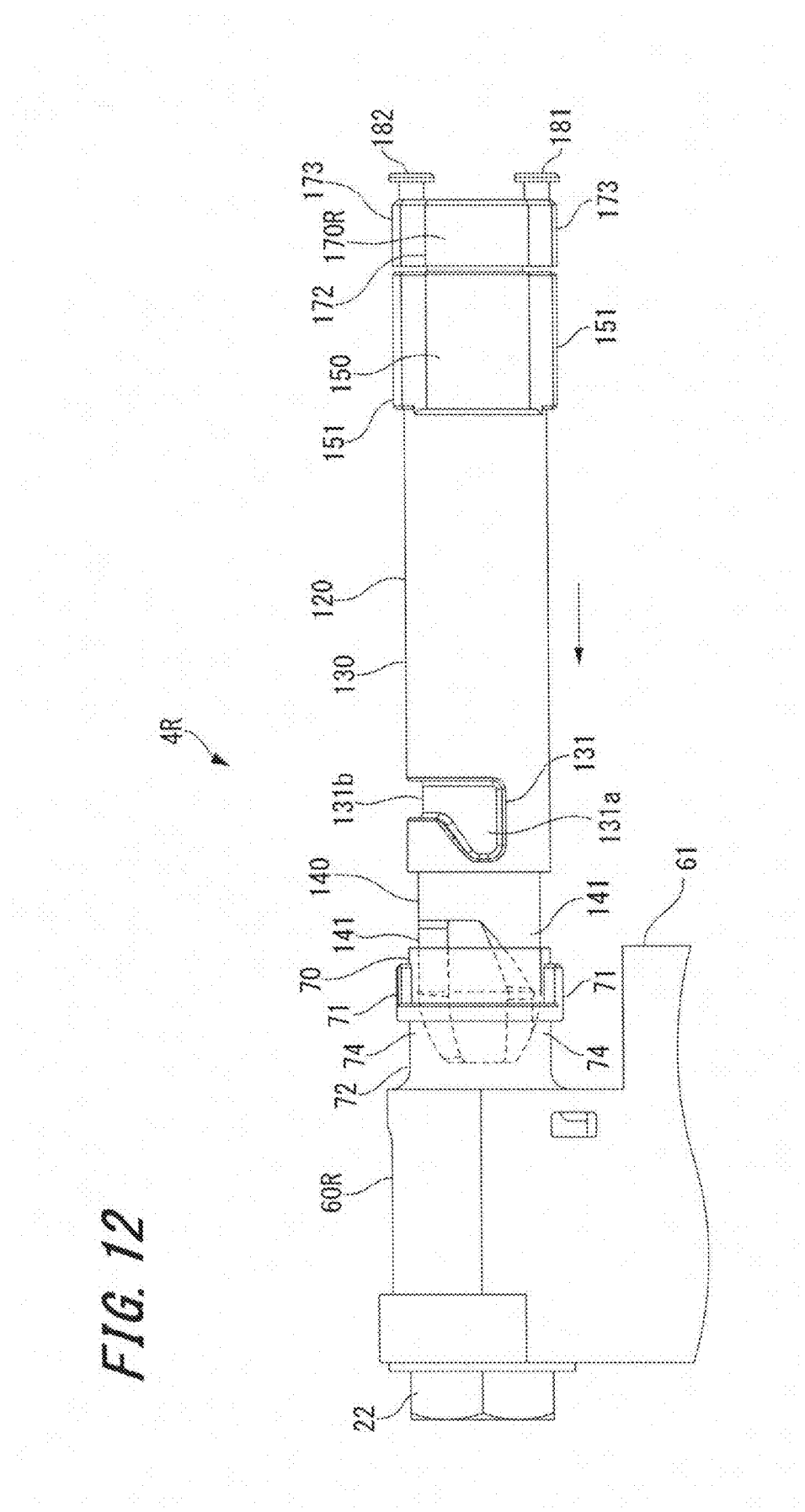
FIG. 12 is an illustrative view of a cam mechanism according to an embodiment of the disclosure.

FIG. 12 is an illustrative view of a cam mechanism (at 4R) according to an embodiment of the disclosure. FIG. 12 shows the state in which cam part 140 of movable-side cam member 120 contacts cam part 70 of inner-side holder 60R. One edge part 161 of coiled spring 160 is configured to contact the level-difference part formed in the inside of main-body part 130 of movable-side cam member 120, other edge part 162 is configured to contact the end surface of cylindrical part 171 of outer-side holder 170R (see FIG. 14). Therefore, movable-side cam member 120 is always biased in the direction (arrow axial direction of FIG. 12) towards inner-side holder 60R. However, when the opening angle of tablet terminal 1 is at or between 0 to 90 degrees, cam part 70 (convex part 74) of inner-side holder 60R and cam part 140 (convex part 141) of movable-side cam member 120 contact. Thus, movable-side cam member 120 is unmovable with respect to inner-side holder 60R side. In other words, projecting strip 151 of movable-side cam member 120 is not inserted in grooved line 115 of cylinder 110.

FIGS. 13A and 13B are perspective views of the cam mechanism (at 4R) of FIG. 12 according to an embodiment of the disclosure. FIG. 13A shows the structure of cam part 70 of inner-side holder 60R. FIG. 13B shows cam part 140 of movable-side cam member 120. As shown in FIG. 13A, cam part 70 of inner-side holder 60R has a symmetrical shape centered on through-hole 67 in a cylindrical inside surface. For example, convex part 74 which has slope 75i and vertical surface 75v is formed by the interval spacing of 180 degrees. As shown to FIG. 13B, cam part 140 of movable-side cam member 120 has a symmetrical shape centered on through-hole 143. For example, convex part 141 which has slope 142i and vertical surface 142v is formed by the interval spacing of 180 degrees. With the shape of cam part 70 and cam part 140, after the opening angle of tablet terminal 1 reaches a predetermined angle (for example, 30 degrees) or more, will cam part 70 of inner-side holder 60R and cam part 140 of movable-side cam member 120 fit or engage. In other words, movable-side cam member 120 is allowed to move along with inner-side holder 60R side. By changing the shape of both cam parts 70, 140, the opening angle of tablet terminal 1, which causes stand member 10 to reach a locked state, can be changed.

Figure 14:
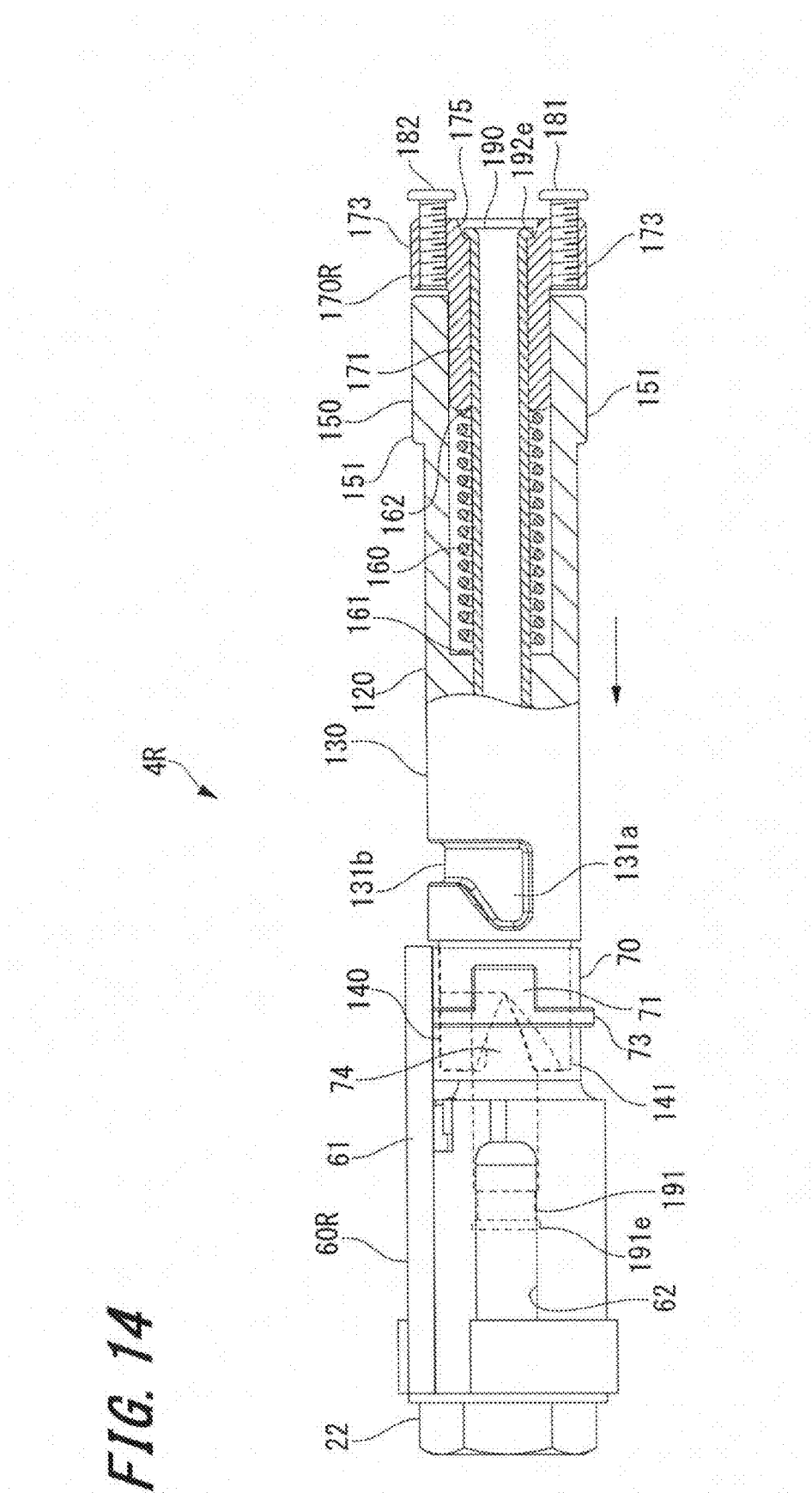
FIG. 14 is a sectional view in partial cross-section of the cam mechanism of FIG. 12 according to an embodiment of the disclosure.

FIG. 14 is a sectional view in partial cross-section of the cam mechanism (at 4R) of FIG. 12 in which cam part 140 of movable-side cam member 120 is fitted to cam part 70 of inner-side holder 60R according to an embodiment of the disclosure. In FIG. 14, when the opening angle of tablet terminal 1 becomes larger than about 30 degrees, for example, movable-side cam member 120 will move towards inner-side holder 60R side (see axial direction arrow). And then, when the opening angle of tablet terminal 1 becomes 90 degrees, cam part 70 of inner-side holder 60R and cam part 140 of movable-side cam member 120 will fit or engage. Thus, projecting strip 151 of movable-side cam member 120 is inserted in grooved line 115 of cylinder 110. As a result, it will not be possible to rotate stand member 10 with respect to keyboard device 2 (fixing member 200R), and stand member 10 will be in a locked state.

Figure 15:
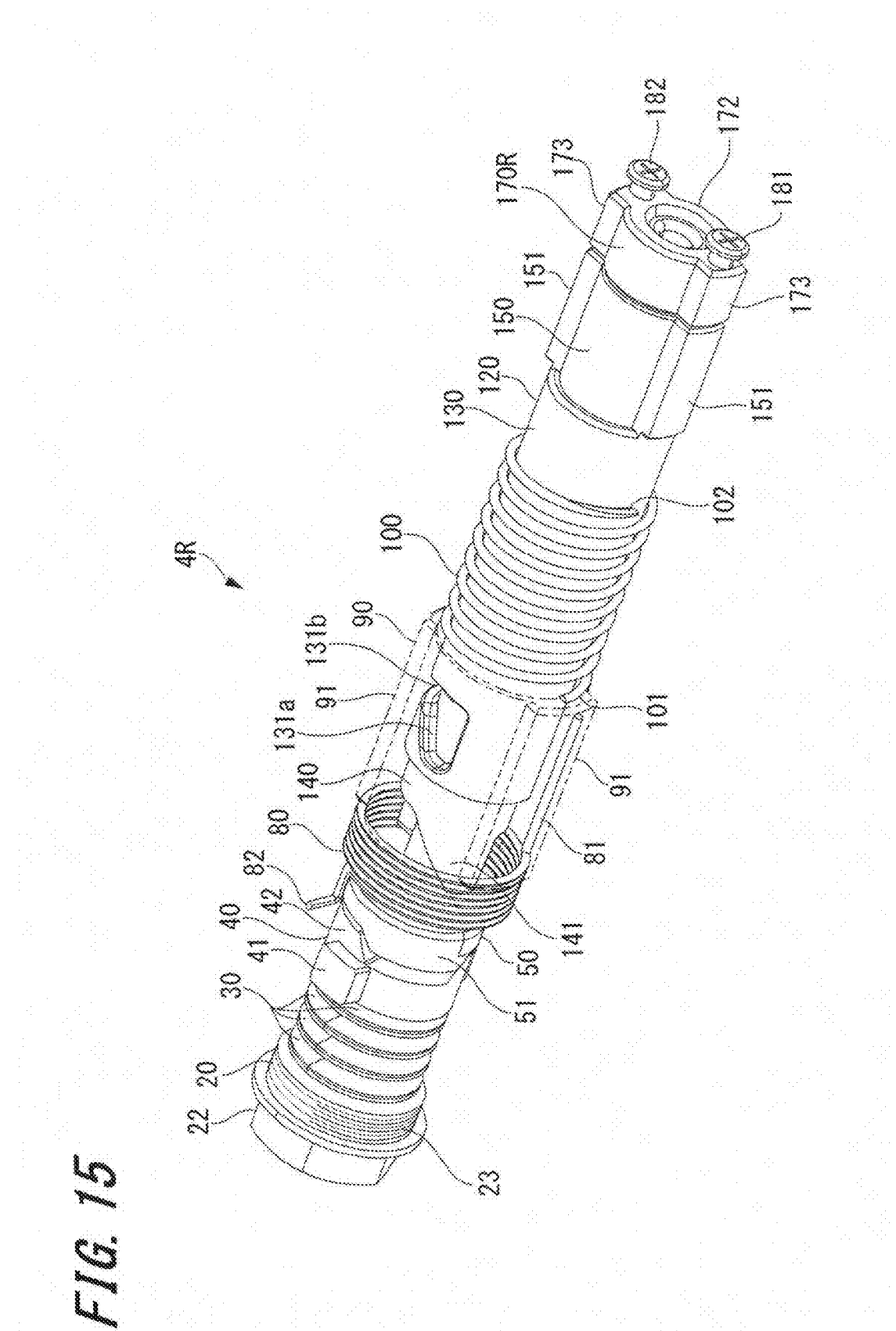
FIG. 15 is a schematic perspective view of the hinge structure with a stand in a locked state according to an embodiment of the disclosure.

FIG. 15 is a schematic perspective view of hinge structure 4R with a stand member 10 in a locked state according to an embodiment of the disclosure. FIG. 15 shows the state which tablet terminal 1 (inner holder) is opened to a stand position, as discussed above. In FIG. 15, inner-side holder 60R and cylinder 110 are omitted. As shown in FIG. 15, edge part 81 of torsion spring 80 also rotates about 30-90 degrees, for example, by having opened tablet terminal 1 (inner-side holder 60R) at about 30-90 degrees, for example, and movable-side cam member 120 is configured to move with inner-side holder 60R. Since, in this instance, protrusion 95 of starting circular-cylinder 90 is configured to move towards third guide groove portion 131c when stand member 10 exits the locked state. Protrusion 95 does not appear in FIG. 15.

Figure 16:
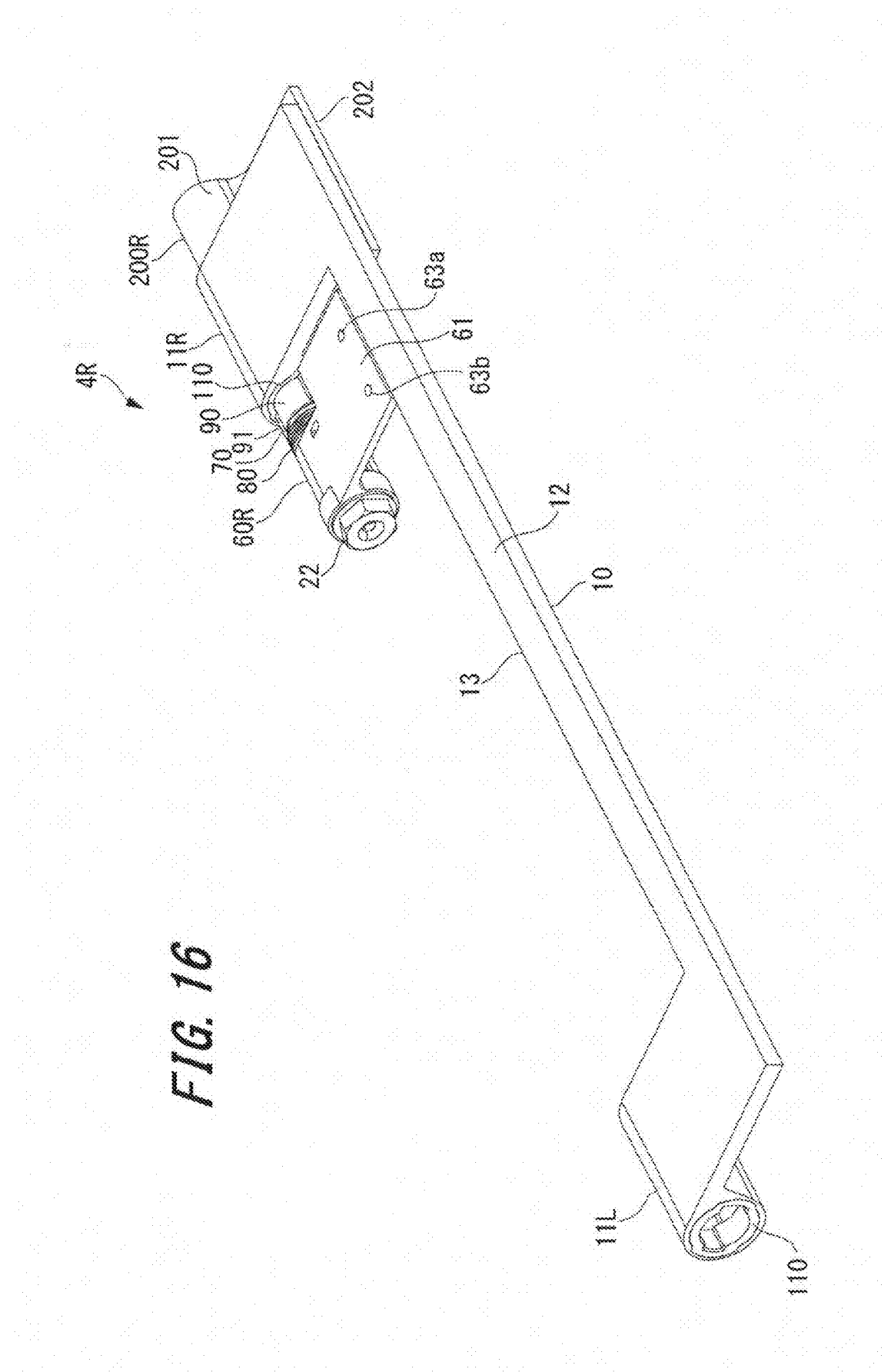
FIG. 16 is a perspective view illustrating a closed state of the tablet terminal relative to the hinge structure and the stand member at or near 0 degrees with respect to the keyboard device according to an embodiment of the disclosure.

FIG. 16 is a perspective view illustrating a closed state of tablet terminal 1 relative to hinge structure 4R and stand member 10 at or near 0 degrees with respect to keyboard device 2 according to an embodiment of the disclosure.

In FIG. 16, in operation, (1) a drawing-in torque acts on tablet terminal 1 (inner-side holder 60R) in a closing direction. Next, (2) stand member 10 does not open via the fitting between starting circular-cylinder 90 (groove 92) and inner-side holder 60R (convex part 71). Further, (3) movable-side cam member 120 (guide groove 131) does not draw in starting circular-cylinder 90 (protrusion 95). Finally, (4) cam part 70 of inner-side holder 60R and cam part 140 of movable-side cam member 120 do not fit or engage, and stand member 10 is in an unlocked state.

Figure 17:
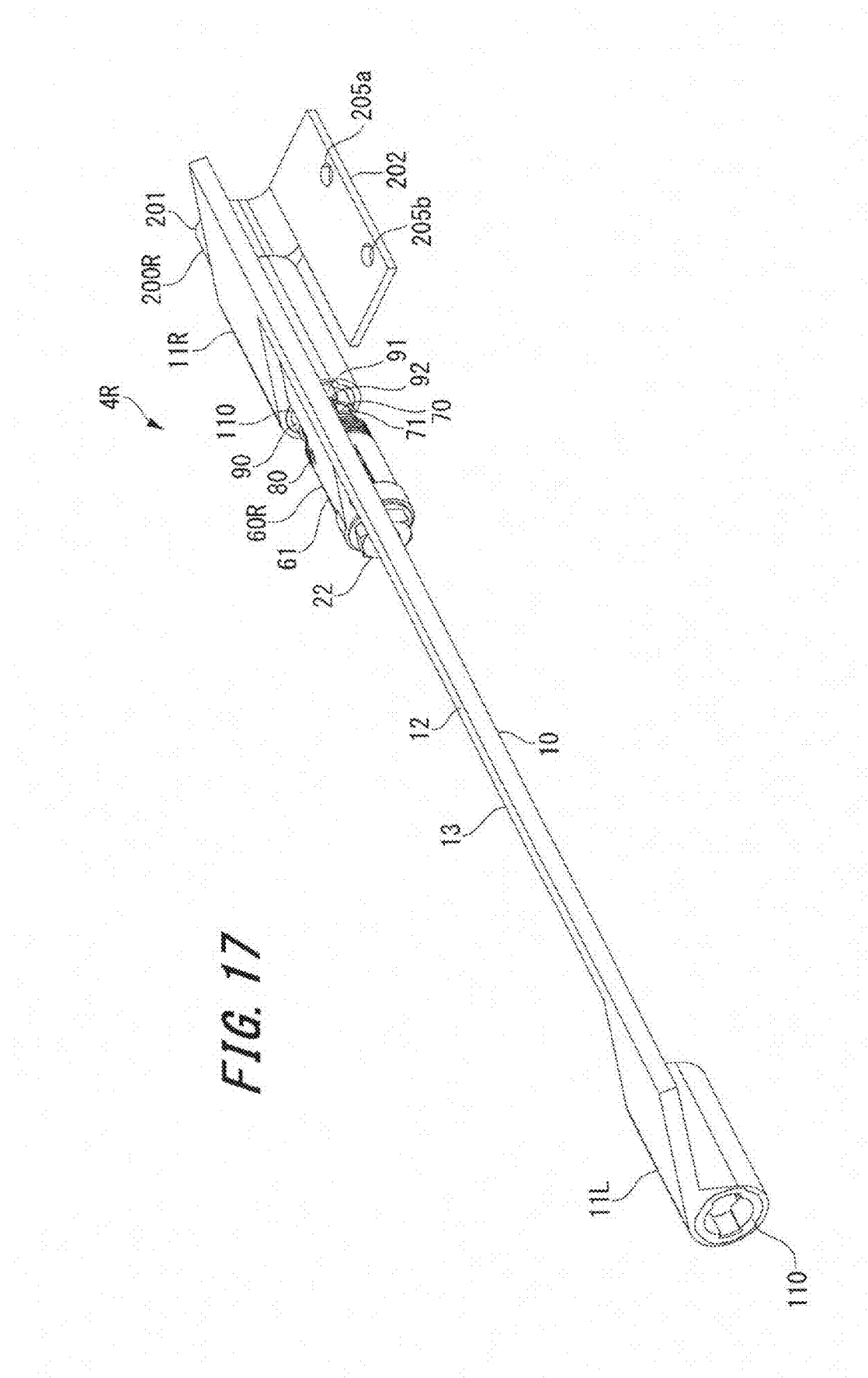
FIG. 17 is a perspective view illustrating a partially opened state of the tablet terminal relative to the hinge structure and the stand member at or near 30 degrees with respect to the keyboard device according to an embodiment of the disclosure.

FIG. 17 is a perspective view illustrating a partially opened state of tablet terminal 1 relative to hinge structure 4R and stand member 10 at or near 30 degrees with respect to the keyboard device 2 according to an embodiment of the disclosure. Thus, for example, keyboard device 2 is at or near 0 degrees, tablet terminal 1 is at or near 30 degrees (a user opens by hand), and stand member 10 is at or near 30 degrees (stand member 10 opens in response to tablet terminal 1 position).

In FIG. 17, in operation, (1) tablet terminal 1 (inner-side holder 60R) escapes from a drawing-in torque, and can now freely maintain a position. Next (2) the fitting between starting circular-cylinder 90 (groove 92) and inner-side holder 60R (convex part 71) is removed or separated via guide groove 131 of movable-side cam member 120. It should be noted that torsion spring 80 is configured to now automatically open stand member 10 to extend to about 185 degrees with respect to keyboard device 2.

Figure 18:
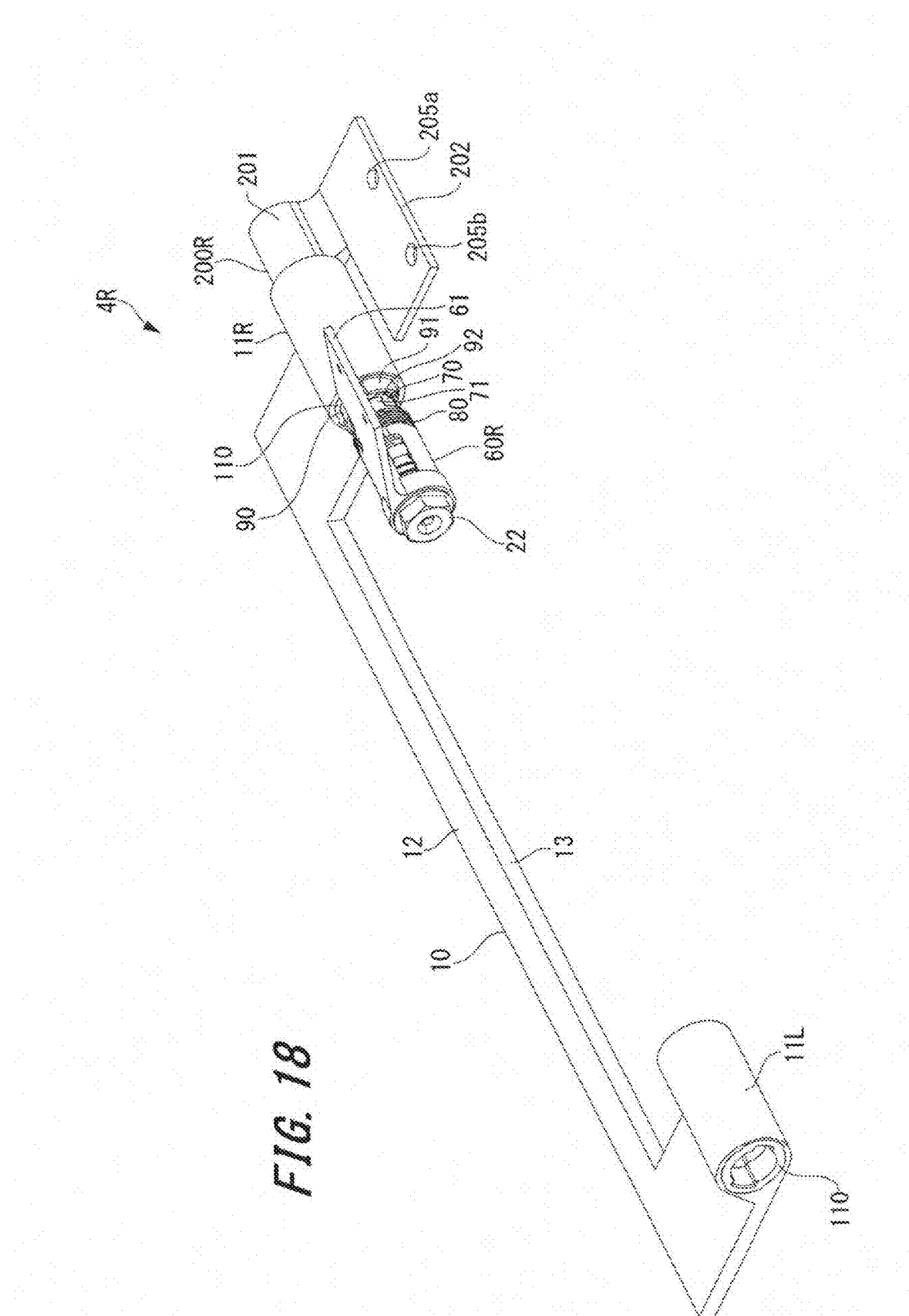
FIG. 18 is a perspective view illustrating a partially opened state as in FIG. 17 where the stand member is automatically opened according to an embodiment of the disclosure.

FIG. 18 is a perspective view illustrating a partially opened state as in FIG. 17 where stand member 10 is automatically opened (for example, 180 to 185 degrees) according to an embodiment of the disclosure. In this state, keyboard device 2 is at or near 0 degrees, tablet terminal 1 is at or near 30 degrees (same as FIG. 17), and stand member 10 is at or near 185 degrees (stand member 10 opened fully with helical spring 80).

Figure 19:
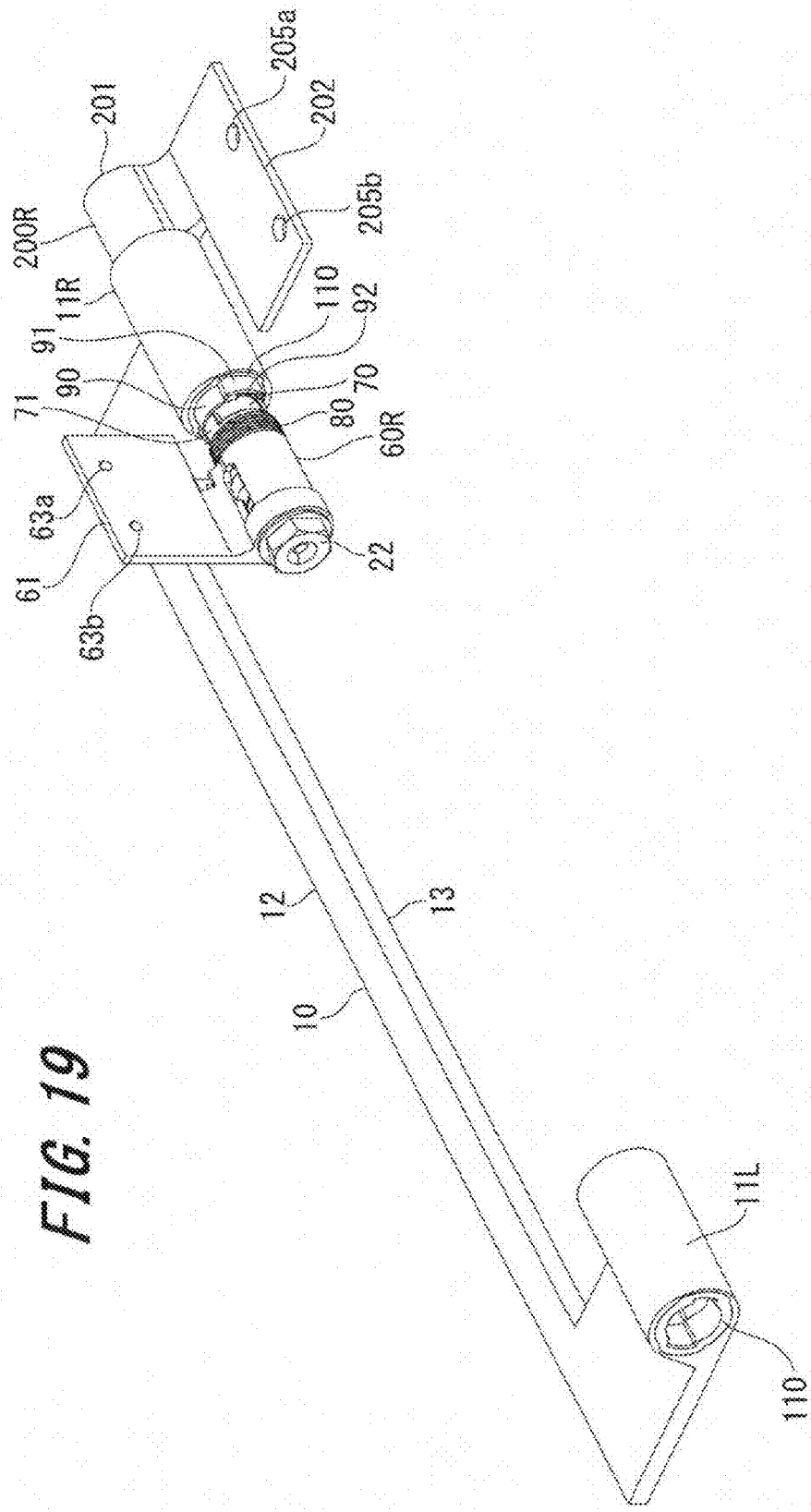
FIG. 19 is a perspective view illustrating a partially opened state of the tablet terminal relative to the hinge structure where the stand member is opened at or near 90 degrees with respect to the keyboard device according to an embodiment of the disclosure.

FIG. 19 is a perspective view illustrating a partially opened state of tablet terminal 1 relative to hinge structure 4R where stand member 10 is opened at or near 90 degrees with respect to keyboard device 2 according to an embodiment of the disclosure. FIG. 19 shows the state in which the user has opened tablet terminal 1 to about 90 degrees (stand member 10 is locked). In this state, keyboard device 2 is at or near 0 degrees, tablet terminal 1 is at or near 90 degrees (a user opens by hand), and stand member 10 is at or near 185 degrees (stand member 10 opened fully with helical spring 80).

In FIG. 19, in operation, (1) tablet terminal 1 (inner-side holder 60R) may freely maintain a position as in the case of FIG. 17, FIG. 18. Next, (2) when the opening angle of tablet terminal 1 becomes larger than about 30 degrees, movable-side cam member 120 will move towards inner-side holder 60R side (see axial direction arrow). Finally, (3) by having opened tablet terminal 1 to about 90 degrees, cam part 70 of inner-side holder 60R and cam part 140 of movable-side cam member 120 fit or engage. As a result, stand member 10 and engaging part 150 (keyboard device 2) fit or are in engagement. In this state, stand member 10 may brace tablet terminal 1 as stand member 10 will be in a locked state as tablet terminal 1 and keyboard device 2, in combination, apply a load to stand member 10.

Figure 20:
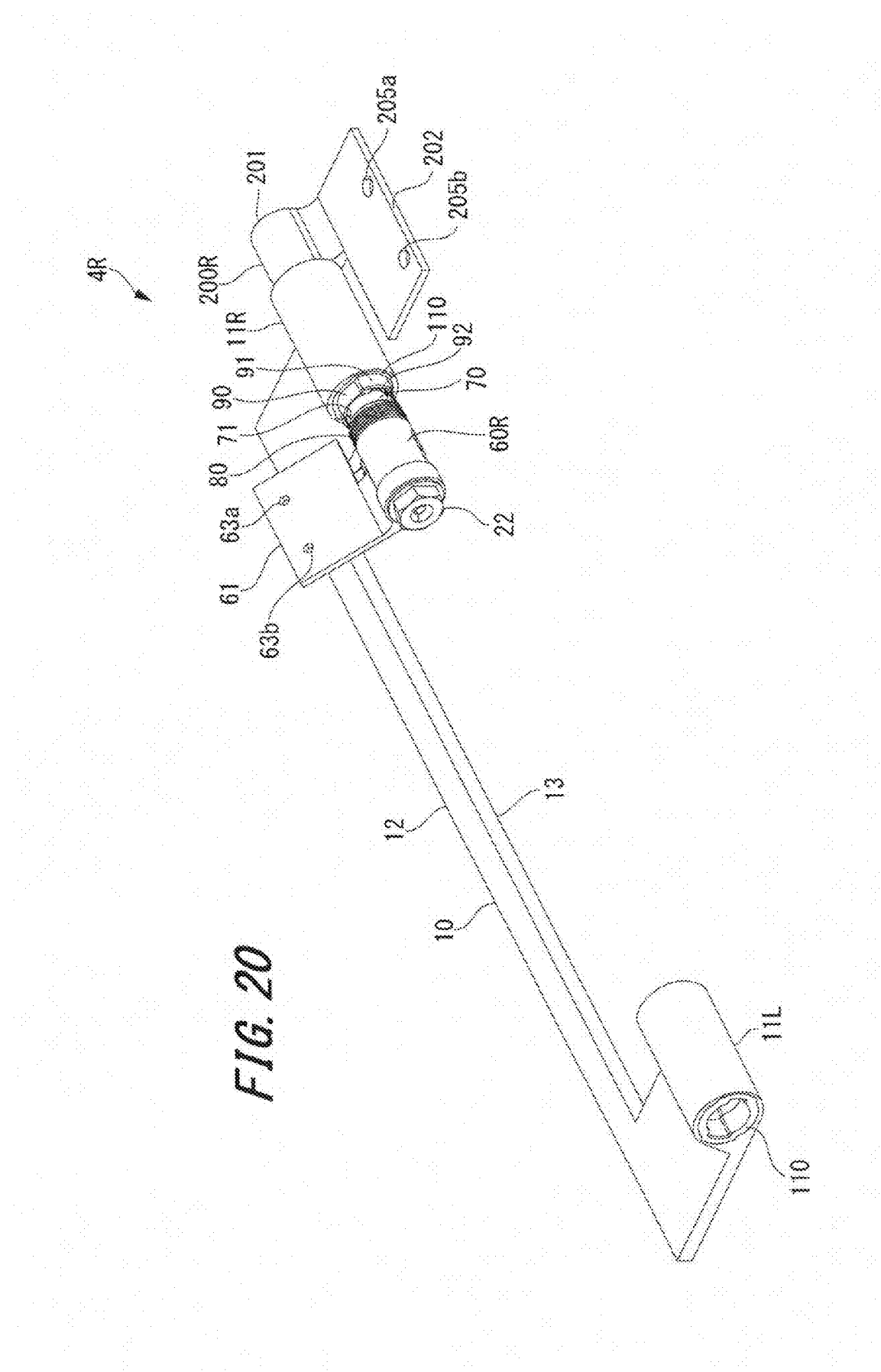
FIG. 20 is a perspective view illustrating a fully opened state of the tablet terminal relative to hinge the structure where the stand member is opened at or near 135 degrees with respect to the keyboard device according to an embodiment of the disclosure.

FIG. 20 is a perspective view illustrating a fully opened state of tablet terminal 1 relative to hinge structure 4R where stand member 10 is opened at or near 135 degrees with respect to keyboard device 2 according to an embodiment of the disclosure. FIG. 20 shows a real use condition in which the user opened tablet terminal 1 to 135 degrees. In this case, keyboard device 2 is at or near 0 degrees, tablet terminal 1 is at or near 135 degrees (a user opens by hand), and stand member 10 is at or near 185 degrees (stand member 10 is in a locked state).

Figure 21:
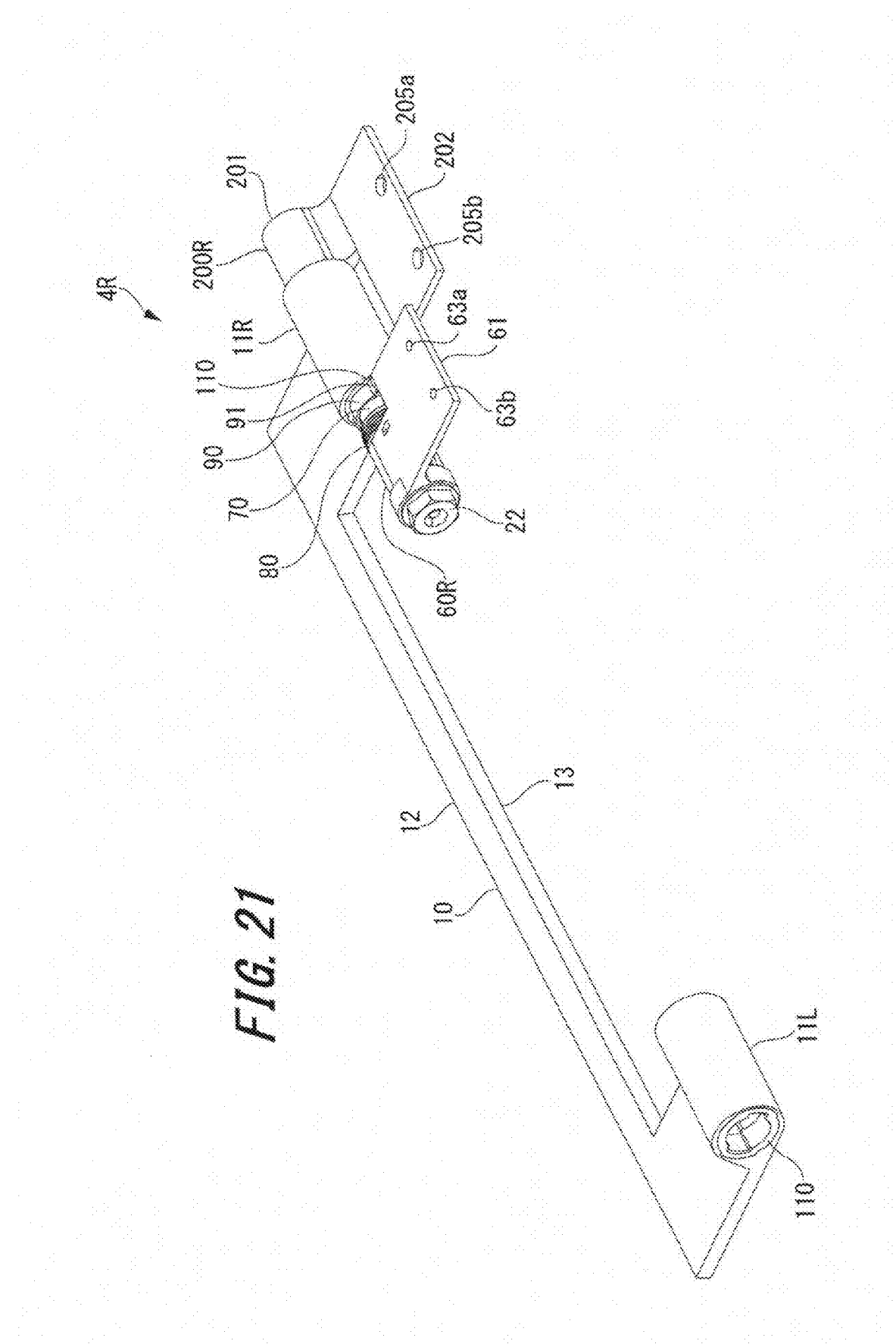
FIG. 21 is a perspective view illustrating a closed state of the tablet terminal relative to the hinge structure and the keyboard device, where the stand member remains fully opened according to an embodiment of the disclosure.

FIG. 21 is a perspective view illustrating a closed state of tablet terminal 1 relative to hinge structure 4R where stand member 10 is open at or near 185 degrees with respect to keyboard device 2 according to an embodiment of the disclosure. FIG. 21 shows the state in which the user closed tablet terminal 1 to 0 degrees. In this state, keyboard device 2 is at or near 0 degrees, tablet terminal 1 is at or near 0 degrees (a user closes by hand), and stand member 10 is at or near 185 degrees (stand member 10 is in a locked state).

In FIG. 21, in operation, (1) by having closed tablet terminal 1 to about 90 degrees, cam part 70 of inner-side holder 60R and cam part 140 of movable-side cam member 120 start pushing each other (movable-side cam member 120 will be extruded by inner-side holder 60R in an opposite direction).

Next, (2) as a result, stand member 10 and engaging part 150 (keyboard device 2) are released. In this state, stand member 10 will be in an unlocked state as tablet terminal 1 and keyboard device 2. Thus, stand member 10 is configured to be capable of being rotated and returned to its closed or initial position by hand. Finally, (3) drawing-in torque acts on tablet terminal 1 (inner-side holder 60R) to a closing direction similarly to the case of FIG. 16.

FIG. 22 is a perspective view illustrating a closed state where stand member 10 is returned to its initial position according to an embodiment of the disclosure. FIG. 22 shows the state to which the user returned stand member 10 to its initial position by hand or manually. In this state, keyboard device 2 is at or near 0 degrees, tablet terminal 1 is at or near 0 degrees (a user closes by hand), and stand member 10 is at or near 0 degrees (a user closes by hand).

In FIG. 22, in operation, (1) drawing-in torque acts on tablet terminal 1 (inner-side holder 60R) to a closing direction, as in the case of FIG. 16, FIG. 21. Next, (2) as in FIG. 16, starting circular-cylinder 90 (groove 92) and inner-side holder 60R (convex part 71) fit or are engaged again, and thus do not open stand member 10. Further, (3) movable-side cam member 120 (guide groove 131) does not draw in starting circular-cylinder 90 (protrusion 95), like in FIG. 16. Finally, (4) the fitting of cam part 70 of inner-side holder 60R and cam part 140 of movable-side cam member 120 is removed or separated, and stand member 10 is in an unlocked state.

In certain embodiments, screw-hole 174 is parallel to shaft 190 and formed in outer-side holder 170R. Thereby, outer-side holder 170R and fixing member 200R by which shaft 190 was inserted is fastened via screws. Alternatively, for example, it is possible that with respect to shaft 190 and outer-side holder 170R, an alternative screw-hole may be configured to be vertical to the axis of shaft 190 and shaft 190, outer-side holder 170R, and fixing member 200R are fixed using this alternative screw-hole.

Alternatively, the structure which fastens cap 20 to inner-side holder 60R, may be configured to cover opening part of inner-side holder 60R using another means. Further, the angle in which stand member 10 is fully opened at or near 185 degrees, may be other angles, such as 180 degrees, or the like. However, when the angle is set as 185 degrees, since stand member 10 contacts reliably upon a desk-top surface, or the like compared with the case where it is set in the vicinity of 180 degrees or 185 degrees, stability is well maintained.

In addition, by changing the shape of engagement surface of inner side cam member 40 and outer side cam member 50, for example, it may be possible for the drawing-in torque to generate, in the real use conditions, which may open tablet terminal 1 to 135 degrees with respect to keyboard device 2.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, define, in part, the scope of the foregoing claim terminology such that no inventive subject matter is dedicated to the public.

The above disclosure also encompasses the embodiments noted below.

(1) A hinged support and stand apparatus, comprising: a stand; a rotating member attached to the stand and a holding part configured to removably attach a mobile device thereto, wherein the rotating member is configured to coaxially rotate the stand and the rotating member, the rotating member including a first rotating mechanism configured to rotate the rotating member, a second rotating mechanism configured to rotate the stand member, and a locking mechanism configured to fix a rotational position of the stand member in a locked state when the holding part is opened to a first angle equal to or greater than a second angle and the stand member has been rotated to a position where the stand member is configured to brace the attached mobile device.

(2) The apparatus according to (1), wherein the stand member is configured to rotate in conjunction with the holding part.

(3) The apparatus according (1) or (2), wherein the second rotating mechanism is configured to rotate the stand member along with the rotating member which in turn rotates in conjunction with the holding part.

(4) The apparatus according to (1) to (3), wherein when the attached mobile device is rotated from a closed position to the second angle, the rotating member engages the stand member and when the attached mobile device is further rotated beyond the second angle, then the rotating member disengages from the stand member, so as to automatically open the stand member to the first angle to act as a stand in the locked state.

(5) The apparatus according to (1) to (4), wherein when a user rotates the attached mobile device by hand to a closed position, the stand member is configured to be in a released or unlocked state.

(6) The apparatus according to (1) to (5), further comprising: a keyboard device configured to be removably attached to the hinge structure along a keyboard portion.

(7) The apparatus according to (1) to (6), wherein the first angle is in an inclusive range of 90 through 135 degrees with respect to the keyboard device.

(8) The apparatus according to (1) to (7), wherein the second angle is in an inclusive range of 30 through 90 degrees with respect to the keyboard device.

(9) The apparatus according to (1) to (8), wherein the attached mobile device includes a liquid crystal panel display portion.

(10) The apparatus according to (1) to (9), wherein the attached mobile device comprises a tablet computer.

(11) The apparatus according to (1) to (10), wherein further comprising a cam mechanism configured to lock the stand member in a locked state when the mobile device mounted to the holding part is rotated to a second predetermined angle relative to a body of the mobile device.

(12) The apparatus according to (1) to (11), wherein the cam mechanism is further configured to unlock the stand member when the mobile device mounted to the holding part is rotated to a third predetermined angle relative to the body of the mobile device.

(13) The apparatus according to (1) to (12), wherein the holding part is configured to have a substantially U-shaped cross section in a radial direction from an axis of rotation to accommodate and fixedly hold the mobile device.

(14) The apparatus according to (1) to (13), wherein the cam mechanism includes an inner side cam member and an outer side cam member configured to engage each other so as to generate a torque applied to the hinge structure upon rotation of the holding part.

(15) The apparatus according to (1) to (14), wherein the cam mechanism includes a movable-side cam member configured to move in an axial direction and cause the stand member to lock in the locked state.

(16) The apparatus according to (1) to (15), wherein the cam mechanism includes a movable-side cam member configured to move in an axial direction and unlock the stand member, wherein the movable-side cam member includes a main-body part and an engaging part.

(17) The apparatus according to (1) to (16), wherein the main-body part is a cylinder having a guide groove formed on an outer peripheral surface of the cylinder, wherein the guide groove includes a first guide groove portion, a second guide groove portion and a third guide groove portion, each configured to cause a predetermined movement of the movable-side cam member.

(18) The apparatus according to (1) to (17), wherein the engaging part includes a cylinder having projecting strips configured to engage and disengage the stand member based on a predetermined position of the movable-side cam member.

(19) A hinged support and stand apparatus, comprising: a bracing means; a rotating means attached to the bracing means and a holding means configured to removably attach a mobile device thereto, wherein the rotating means is configured to coaxially rotate the bracing means and the rotating means, the rotating means including a first rotating means for rotating the rotating means, a second rotating means for rotating the bracing means, and a locking means for locking the bracing means, where the locking means is configured to fix a rotational position of the bracing means in a locked state when the holding means is opened to a first angle equal to or greater than a second angle and the bracing means has been rotated to a position where the bracing means braces the attached mobile device.

(20) A hinged support and stand system, comprising: a mobile device; a keyboard body configured to include a plurality of input keys; a stand; a rotating member attached to the stand and a holding part configured to removably attach the mobile device thereto, wherein the rotating member is configured to coaxially rotate the stand and the rotating member, the rotating member including a first rotating mechanism configured to rotate the rotating member, a second rotating mechanism configured to rotate the stand member, and a locking mechanism configured to fix a rotational position of the stand member in a locked state when the holding part is opened to a first angle equal to or greater than a second angle and the stand member has been rotated to a position where the stand member is configured to brace the attached mobile device.

The invention claimed is:
1. A hinged support and stand apparatus, comprising: a stand; a rotating member attached to the stand and a holding part configured to removably attach a mobile device thereto, wherein the rotating member is configured to coaxially rotate the stand and the rotating member, the rotating member including a first rotating mechanism configured to rotate the rotating member, a second rotating mechanism configured to rotate the stand member, and a locking mechanism configured to fix a rotational position of the stand member in a locked state when the holding part is opened to a first angle equal to or greater than a second angle and the stand member has been rotated to a position where the stand member is configured to brace the attached mobile device, wherein the attached mobile device comprises a tablet computer, and when the attached mobile device is rotated from a closed position to the second angle, the rotating member engages the stand member and when the attached mobile device is further rotated beyond the second angle, the rotating member disengages from the stand member, so as to automatically open the stand member to the first angle to act as a stand in the locked state.

2. The apparatus according to claim 1, wherein the stand member is configured to rotate in conjunction with the holding part.

3. The apparatus according to claim 1, wherein the second rotating mechanism is configured to rotate the stand member along with the rotating member which in turn rotates in conjunction with the holding part.

4. The apparatus according to claim 1, wherein when a user rotates the attached mobile device by hand to a closed position, the stand member is configured to be in a released or unlocked state.

5. The apparatus according to claim 1, further comprising:
a keyboard device configured to be removably attached to the hinge structure along a keyboard portion.

6. The apparatus according to claim 5, wherein the first angle is in an inclusive range of 90 through 135 degrees with respect to the keyboard device.

7. The apparatus according to claim 5, wherein the second angle is in an inclusive range of 30 through 90 degrees with respect to the keyboard device.

8. The apparatus according to claim 1, wherein the attached mobile device includes a liquid crystal panel display portion.

9. The apparatus according to claim 1, further comprising a cam mechanism configured to lock the stand member in a locked state when the mobile device mounted to the holding part is rotated to a second predetermined angle relative to a body of the mobile device.

10. The apparatus according to claim 9, wherein the cam mechanism is further configured to unlock the stand member in an unlocked state when the mobile device mounted to the holding part is rotated to a third predetermined angle relative to the body of the mobile device.

11. The apparatus according to claim 9, wherein the cam mechanism includes an inner side cam member and an outer side cam member configured to engage each other so as to generate a torque applied to the hinge structure upon rotation of the holding part.

12. The apparatus according to claim 9, wherein the cam mechanism includes a movable-side cam member configured to move in an axial direction and cause the stand member to lock in the locked state.

13. The apparatus according to claim 9, wherein the cam mechanism includes a movable-side cam member configured to move in an axial direction and unlock the stand member,
wherein the movable-side cam member includes a main-body part and an engaging part.

14. The apparatus according to claim 13, wherein the main-body part is a cylinder having a guide groove formed on an outer peripheral surface of the cylinder,
wherein the guide groove includes a first guide groove portion, a second guide groove portion and a third guide groove portion, each configured to cause a predetermined movement of the movable-side cam member.

15. The apparatus according to claim 13, wherein the engaging part includes a cylinder having projecting strips configured to engage and disengage the stand member based on a predetermined position of the movable-side cam member.

16. The apparatus according to claim 1, wherein the holding part is configured to have a substantially U-shaped cross section in a radial direction from an axis of rotation to accommodate and fixedly hold the mobile device.

17. A hinged support and stand apparatus, comprising: a bracing means; a rotating means attached to the bracing means and a holding means configured to removably attach a mobile device thereto, wherein the rotating means is configured to coaxially rotate the bracing means and the rotating means, the rotating means including a first rotating means for rotating the rotating means, a second rotating means for rotating the bracing means, and a locking means for locking the bracing means, where the locking means is configured to fix a rotational position of the bracing means in a locked state when the holding means is opened to a first angle equal to or greater than a second angle and the bracing means has been rotated to a position where the bracing means braces the attached mobile device, wherein the attached mobile device comprises a tablet computer, and when the attached mobile device is rotated from a closed position to the second angle, the rotating means engages the bracing means and when the attached mobile device is further rotated beyond the second angle, the rotating means disengages from the bracing means, so as to automatically open the bracing means to the first angle to act as a stand in the locked state.

18. A hinged support and stand system, comprising: a mobile electronic device; a keyboard body configured to include a plurality of input keys; a stand; a rotating member attached to the stand and a holding part configured to removably attach the mobile electronic device thereto, wherein the rotating member is configured to coaxially rotate the stand and the rotating member, the rotating member including a first rotating mechanism configured to rotate the rotating member, a second rotating mechanism configured to rotate the stand member, and a locking mechanism configured to fix a rotational position of the stand member in a locked state when the holding part is opened to a first angle equal to or greater than a second angle and the stand member has been rotated to a position where the stand member is configured to brace the attached mobile electronic device, wherein when the attached mobile electronic device is rotated from a closed position to the second angle, the rotating member engages the stand member and when the attached mobile electronic device is further rotated beyond the second angle, the rotating member disengages from the stand member, so as to automatically open the stand member to the first angle to act as a stand in the locked state.

* * * * *